(12) United States Patent
Balasubramanian et al.

(10) Patent No.: US 11,494,776 B2
(45) Date of Patent: Nov. 8, 2022

(54) METHOD AND SYSTEM FOR PROVIDING PERFORMANCE ASSESSMENT OF TERMINAL DEVICES

(71) Applicant: MASTERCARD INTERNATIONAL INCORPORATED, Purchase, NY (US)

(72) Inventors: Balamurali Balasubramanian, Chennai (IN); Amresh M D, Chennai (IN); Vikas Chandra, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 87 days.

(21) Appl. No.: 16/806,041

(22) Filed: Mar. 2, 2020

(65) Prior Publication Data
US 2020/0279267 A1 Sep. 3, 2020

(30) Foreign Application Priority Data
Mar. 1, 2019 (SG) .............................. 10201901857P

(51) Int. Cl.
*G06Q 20/40* (2012.01)
*G06Q 20/20* (2012.01)

(52) U.S. Cl.
CPC ....... *G06Q 20/4016* (2013.01); *G06Q 20/204* (2013.01); *G06Q 20/206* (2013.01); *G06Q 20/4093* (2013.01)

(58) Field of Classification Search
CPC ............. G06Q 20/4016; G06Q 20/204; G06Q 20/206; G06Q 20/32; G06Q 10/06; G06Q 20/4093
See application file for complete search history.

(56) References Cited

U.S. PATENT DOCUMENTS 10,079,851 B2 * 9/2018 Shaikh ................ H04L 61/2007
10,373,167 B2 * 8/2019 Zovi ................... G06Q 20/4016
(Continued)

FOREIGN PATENT DOCUMENTS

WO 2016050990 A1 4/2016

OTHER PUBLICATIONS

International Search Report and Written Opinion for International Patent Application No. PCT/US2020/020057, dated Jun. 25, 2020, 11 pages.
(Continued)

*Primary Examiner* — Bruce I Ebersman
*Assistant Examiner* — Matthew Cobb
(74) *Attorney, Agent, or Firm* — Jordan IP Law, LLC

(57) ABSTRACT

A method for providing performance assessment of terminal devices is provided. A user initiates, by way of a service application that runs on a user device of the user, a first request for obtaining risk scores or connectivity scores of the terminal devices. The first request may include terminal identifiers of specific terminal devices or information pertaining to a specific geographical area. The user device communicates the first request to a server. The server determines the risk scores or the connectivity scores based on the first request. The server transmits, to the user device, a first response that includes the risk scores or the connectivity scores. The user device displays the risk scores or the connectivity scores to the user based on the first response, thereby providing the performance assessment of the terminal devices.

18 Claims, 19 Drawing Sheets

(56) References Cited

U.S. PATENT DOCUMENTS

| | | | |
|---|---|---|---|
| 2006/0282660 A1* | 12/2006 | Varghese | G06Q 20/4016 |
| | | | 713/155 |
| 2010/0010930 A1* | 1/2010 | Allen | G06Q 40/00 |
| | | | 705/38 |
| 2013/0138563 A1* | 5/2013 | Gilder | G06Q 20/4016 |
| | | | 705/44 |
| 2015/0095990 A1* | 4/2015 | Ranganathan | G06Q 20/4016 |
| | | | 726/4 |
| 2016/0196558 A1* | 7/2016 | Mercilie | G06Q 20/327 |
| | | | 705/44 |
| 2017/0011382 A1* | 1/2017 | Zoldi | G06Q 20/32 |
| 2017/0171047 A1* | 6/2017 | Freishtat | G06Q 30/0641 |
| 2018/0005243 A1* | 1/2018 | Zovi | G06Q 20/382 |
| 2019/0340606 A1* | 11/2019 | Olenoski | G06Q 20/4016 |
| 2020/0143380 A1* | 5/2020 | Ranganathan | G06F 21/51 |
| 2020/0265436 A1* | 8/2020 | Chandra | G06Q 20/4037 |

OTHER PUBLICATIONS

International Preliminary Report on Patentability for International Patent Application No. PCT/US2020/020057, dated Sep. 16, 2021, 10 pages.

\* cited by examiner

METHOD AND SYSTEM FOR PROVIDING PERFORMANCE ASSESSMENT OF TERMINAL DEVICES

CROSS-REFERENCE TO RELATED APPLICATION

The present application claims the benefit of priority to Singapore Patent Application No. 10201901857P filed Mar. 1, 2019.

FIELD OF THE INVENTION

The present invention relates to mitigating risks and failures associated with electronic transactions and, more particularly, to a method and a system for providing performance assessment of terminal devices to users.

BACKGROUND

Technological advancements have allowed users to perform electronic transactions at terminal devices using various payment modes (e.g., transaction cards). Such payment modes have enhanced the ease and comfort of the users in performing transactions.

Typically, a user approaches a terminal device to perform a transaction, using a transaction card. The terminal device may be a point-of-sale (POS) device at a store of a merchant, an automated teller machine (ATM), or the like. Sometimes, there may be an element of risk associated with performing transactions at the terminal device. For example, the user performing the transaction at the terminal device may be subject to frauds such as skimming, shimming, eavesdropping, or the like. In certain scenarios, the frauds are results of efforts by unscrupulous entities (e.g., some merchants) to engage in fraudulent activity against the user performing the transaction. These frauds, invariably, result in application of incorrect charges against the transaction card of the user. The user is, thus, forced to engage in long drawn procedures, such as filing of complaints and arbitration, for getting the incorrect charges repealed. Currently, there is no mechanism that allows the user to pre-emptively identify risky terminal devices that pose risks to the user performing transaction. Thus, the user is able to identify the risky terminals only in hindsight.

Furthermore, the transaction initiated by the user at the terminal device may fail due to a variety of reasons such as network outages, connection failures between financial institutions (e.g., a connection between an acquirer associated with the terminal device and a corresponding payment network), or the like. For example, some terminal devices are more prone to connection failures than other terminal devices. A lower probability of a connection failure corresponds to a higher probability of completion of a transaction. No existing mechanism allows the user to identify terminal devices that offer seamless network connectivity (i.e., terminal devices associated with low probabilities of connection failure).

In light of the foregoing, there exists a need for a technical solution that allows users to pre-emptively identify risky terminal devices and those terminal devices that offer seamless network connections.

SUMMARY

In an embodiment of the present invention, a method for providing performance assessment of one or more terminal devices is provided. The method includes receiving, by a server from a user device of a user, a request for one or more risk scores of the one or more terminal devices, respectively. Each risk score indicates a measure of risk associated with performing a transaction at a corresponding terminal device of the one or more terminal devices. Based on the request, the one or more risk scores are determined by the server. Each risk score is determined based on a transaction history of the corresponding terminal device. The one or more risk scores are transmitted to the user device by the server. The one or more risk scores are presented to the user on a user interface rendered on the user device.

In another embodiment of the present invention, a system for providing performance assessment of one or more terminal devices is provided. The system includes a payment network server that is configured to receive, from a user device of a user, a request for one or more risk scores associated of the one or more terminal devices, respectively. Each risk score indicates a measure of risk associated with performing a transaction at a corresponding terminal device of the one or more terminal devices. The payment network server determines, based on the request, the one or more risk scores. Each risk score is determined based on a transaction history of a corresponding terminal device of the one or more terminal devices. The payment network server transmits, to the user device, the one or more risk scores. The one or more risk scores are presented to the user on a user interface rendered on the user device.

In an embodiment of the present invention, a method for providing performance assessment of one or more terminal devices is provided. The method includes receiving, by a server from a user device of a user, a request for one or more connectivity scores of one or more terminal devices, respectively. Each connectivity score is qualitative measure of seamlessness of network connectivity between a corresponding terminal device of the one or more terminal devices and the server. Based on the request, the one or more connectivity scores are determined by the server. Each connectivity score is determined based on a network connectivity history of the corresponding terminal device. The one or more connectivity scores are transmitted to the user device by the server. The one or more connectivity scores are presented to the user on a user interface rendered on the user device.

BRIEF DESCRIPTION OF THE DRAWINGS

Various embodiments of the present invention are illustrated by way of example, and not limited by the appended figures, in which like references indicate similar elements, and in which.

Figure 1:
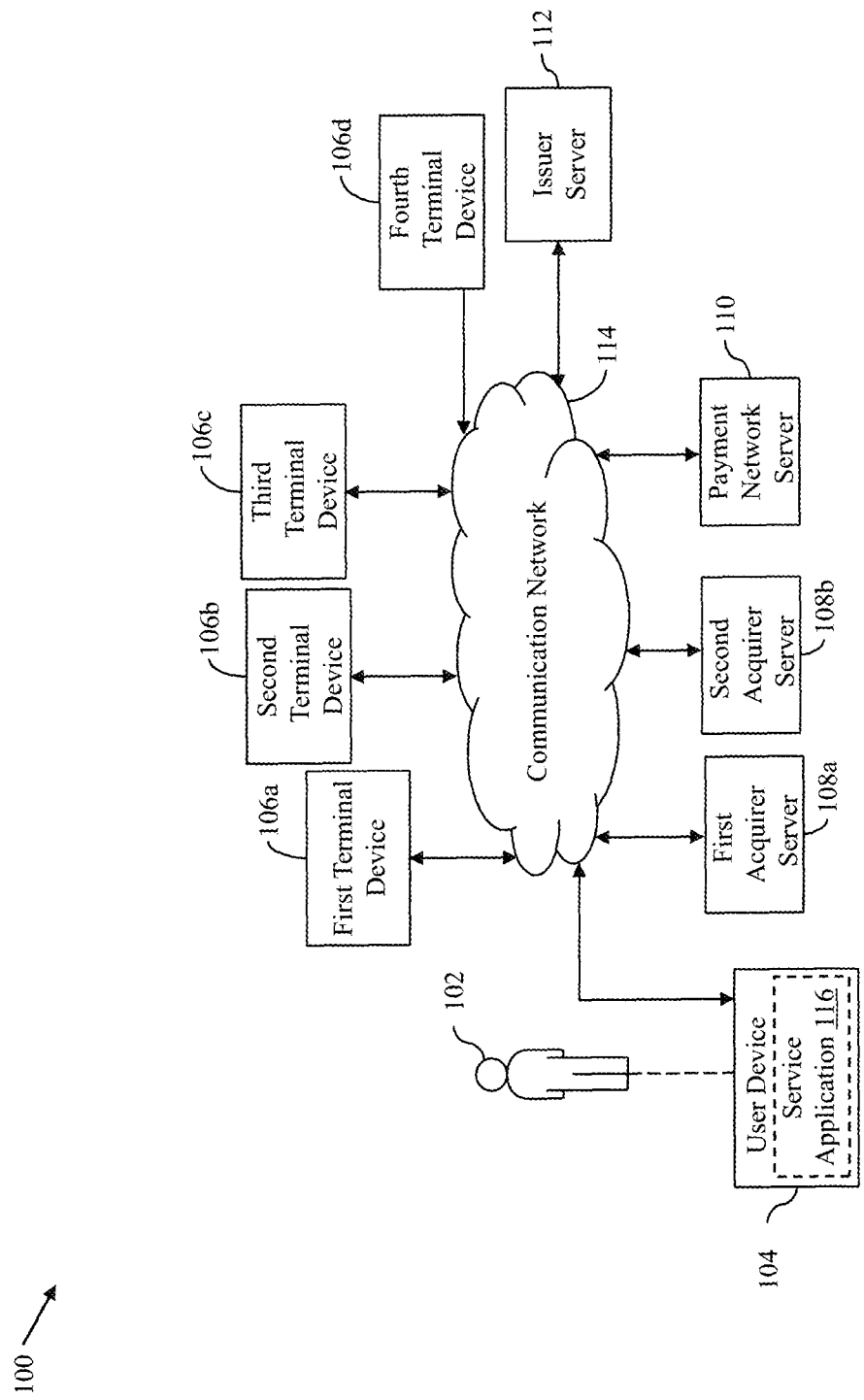
FIG. 1 is a block diagram that illustrates an exemplary environment for providing performance assessment of various terminal devices, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

A user may access a terminal device such as a point-of-sale (POS) device, a point-of-purchase (POP) device, a point-of-interaction (POI) device, or an automated teller machine (ATM) for performing a transaction. The user may use a transaction card for performing the transaction. The transaction performed at the terminal device may be subject to fraud or connectivity issues. For example, performing the transaction at a risky terminal device may expose the user to fraud and performing the transaction at a terminal device that do not offer seamless network connectivity may lead to a failure of the transaction. Generally, the user does not have a provision to pre-emptively identify terminal devices that are risky or those that offer seamless network connectivity.

Various embodiments of the present invention provide a method and a system that solve the abovementioned problems by enabling the user to pre-emptively obtain performance assessment (i.e., risk and connectivity scores) of the terminal devices on a corresponding user device. In one embodiment, the user initiates a first request for obtaining risk scores of terminal devices. The first request may be initiated by the user by using a service application that runs on the user device. In one embodiment, the user may want to obtain the risk scores of one or more specific terminal devices. In such a scenario, the user initiates the first request by specifying terminal identifiers of the specific terminal devices. In another embodiment, the user may want to obtain the risk scores of the terminal devices that are located within a specific geographical area. In such a scenario, the user may initiate the first request by specifying information pertaining to the geographical area (e.g., within a first distance of a first location). The service application generates the first request and communicates the first request to a server (for example, a payment network server, an issuer server, an acquirer server, or the like) that hosts the service application. Based on the first request, the server determines the risk scores of the specific terminal devices or the terminal devices that are located within the first distance of the first location. The server determines the risk scores based on transaction histories of the specific terminal devices or the terminal devices that are located within the first distance of the first location. A transaction history of a terminal device may indicate a count of transactions, performed at the terminal device, that were declined due to at least one of a security violation, an invalid merchant identifier, or a cryptographic error. The server transmits a first response to the user device for communicating the determined risk scores to the user. Based on the first response, the service application may render a user interface (UI) to display the determined risk scores to the user.

In another embodiment, the user initiates a second request, by way of the service application, for obtaining connectivity scores of terminal devices. In one embodiment, the user may want to obtain the connectivity scores of one or more specific terminal devices. In such a scenario, the user initiates the second request by specifying terminal identifiers of the specific terminal devices. In another embodiment, the user may want to obtain the connectivity scores of the terminal devices that are located within a specific geographical area. In such a scenario, the user may initiate the second request by specifying information pertaining to the specific geographical area (e.g., within a second distance of a second location). The service application generates the second request and communicates the second request to the server. Based on the second request, the server determines the connectivity scores of the specific terminal devices or the terminal devices that are located within the second distance of the second location. The server determines the connectivity scores based on network connectivity histories of the specific terminal devices or the terminal devices that are located within the second distance of the second location. A network connectivity history of a terminal device includes an offline time duration of an acquirer associated with the terminal device and a count of transactions declined by the acquirer when the acquirer is online. The server transmits a second response to the user device for communicating the determined connectivity scores to the user. Based on the second response, the service application may render the UI to display the determined connectivity scores to the user.

Thus, the method and system of the present invention enable the user to preemptively identify terminal devices that are risky or those that offer seamless network connectivity.

Terms Description (In Addition to Plain and Dictionary Meaning)

Risk score of a terminal device is a score or a rating that indicates a measure of risk associated with performing a transaction at the terminal device. The risk score may be an absolute number or a percentage. The risk score is determined based on a transaction history of the terminal device.

Transaction history of a terminal device refers to a history of transactions performed at the terminal device. The transaction history of the terminal device includes a count of transactions declined at the terminal device due to at least one of a security violation, an invalid merchant identifier, or a cryptographic error. The transaction history may also include authorization response codes, advice reason codes, or the like, associated with the transactions.

Connectivity score of a terminal device is a qualitative measure of seamlessness of network connectivity between an acquirer associated with the terminal device and a payment network. The connectivity score may be expressed as an absolute number or as a percentage. The connectivity score is determined based on a network connectivity history of the terminal device.

Network connectivity history of a terminal device refers to a history of network connectivity between an acquirer associated with the terminal device and a payment network. The network connectivity history includes an offline time duration of the acquirer, a count of transactions declined by the acquirer due to network failures, or the like.

Performance of a terminal device is characterized by a level of risk associated with performing transactions at the terminal device and a seamlessness of network connectivity offered by the terminal device. In other words, the performance of the terminal device is assessed based on a risk score and a connectivity score associated with the terminal device.

Service application is an application that runs on a user device. The service application allows a user to obtain and view risk scores and/or connectivity scores of various terminal devices before performing a transaction. The service application may be a mobile application or a web application. The service application may be hosted by an issuer or a payment network.

Issuer is a financial institution which establishes and maintains payment accounts of several users. The issuer authorizes and settles transactions in accordance with various payment network regulations and local legislation.

Payment networks, such as those operated by Mastercard®, process transactions between acquirers and issuers. Processing by a payment network includes steps of authorization, clearing, and settlement.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of an acquirer server, a payment network server, or an issuer server.

FIG. 1 is a block diagram that illustrates an exemplary environment 100 for providing performance assessment of various terminal devices, in accordance with an embodiment of the present invention. The environment 100 includes a user 102 in possession of a user device 104. The environment 100 further includes first through fourth terminal devices 106a-106d, first and second acquirer servers 108a and 108b, a payment network server 110, and an issuer server 112. The user device 104, the first through fourth terminal devices 106a-106d, the first and second acquirer servers 108a and 108b, the payment network server 110, and the issuer server 112 may communicate with each other by way of a communication network 114 or through separate communication networks established therebetween.

The user 102 is an individual, who is an account holder of various financial accounts, such as a first payment account. The first payment account may be maintained at a financial institution, such as an issuer. The issuer may have issued a first transaction card (e.g., a debit card, a credit card, or the like) linked to the first payment account to the user 102. The first transaction card may be a physical card or a virtual card stored in a memory of the user device 104. The user 102 may perform various transactions from the first payment account by using the first transaction card.

The user device 104 is a communication device of the user 102 and includes suitable logic, circuitry, interfaces, and/or code, executable by the circuitry that performs various operations for obtaining risk scores and connectivity scores of various terminal devices (e.g., the first through fourth terminal devices 106a-106d). The user device 104 is used by the user 102 to access a service application 116. The service application 116 may be a mobile application or a web application that runs on the user device 104 and is hosted by a financial institution (such as an issuer, an acquirer, or a payment network). The user device 104, executing the service application 116, allows the user 102 to initiate requests for obtaining the risk scores and the connectivity scores of the terminal devices (e.g., the first through fourth terminal devices 106a-106d). Examples of the user device 104 may include a smartphone, a personal computer, a tablet, a phablet, or the like.

The first terminal device 106a may be a point-of-sale (POS) device, a point-of-purchase (POP) device, or a point-of-interaction (POI) device at a first store (not shown) of a first merchant (not shown). The first terminal device 106a allows the user 102 to perform transactions at the first store by using the first transaction card. The first merchant may maintain a first merchant account at a first acquirer for receiving payments for the transactions (i.e., the first terminal device 106a is associated with the first acquirer).

The second terminal device 106b may be a POS device, a POP device, or a POI device at a second store (not shown) of a second merchant (not shown). The second terminal device 106b may be functionally similar to the first terminal device 106a. The second merchant may maintain a second merchant account at the first acquirer (i.e., the second terminal device 106b is associated with the first acquirer).

Similarly, the third terminal device 106c is a POS device, a POP device, or a POI device at a third store (not shown) of a third merchant (not shown). The third terminal device 106c may be functionally similar to the first and second terminal devices 106a and 106b. The third merchant may maintain a third merchant account at a second acquirer that is different from the first acquirer (i.e., the third terminal device 106c is associated with the second acquirer).

The fourth terminal device 106d is an automated teller machine (ATM) maintained by the first acquirer. Hereinafter, the first through fourth terminal devices 106a-106d are collectively referred to as 'terminal devices 106'.

The first acquirer server 108a is a computing server that is associated with the first acquirer that maintains the first, second, and fourth terminal devices 106a, 106b, and 106d. The first acquirer server 108a processes transactions initiated at the first, second, and fourth terminal devices 106a, 106b, and 106d and communicates details of the transactions to various payment network servers, for example, the payment network server 110.

The second acquirer server 108b is a computing server that is associated with the second acquirer that maintains the third terminal device 106c. The second acquirer server 108b processes transactions initiated at the third terminal device 106c and communicates details of the transactions to various payment network servers, for example, the payment network server 110. Hereinafter, the first and second acquirer servers 108a and 108b are collectively referred to as 'acquirer servers 108'.

The payment network server 110 is a computing server that is operated by a payment network. The payment network is an intermediate entity between acquirers and issuers for processing transactions. In one embodiment, the payment network server 110 hosts the service application 116 for enabling the user 102 to obtain the risk scores and the connectivity scores of the terminal devices 106 prior to performing the transactions at the terminal devices 106. A risk score of a terminal device is indicative of a measure of risk associated with performing a transaction at the terminal device. A connectivity score of a terminal device is indicative of a seamlessness of network connectivity between the terminal device and the payment network server 110.

In one example, the user 102 may initiate a first request by way of the service application 116 running on the user device 104 for obtaining the risk scores of one or more terminal devices (for example, the terminal devices 106). On receiving the first request, the payment network server 110 determines the risk scores of the terminal devices 106 based on a transaction history of each terminal device 106. For example, the payment network server 110 may determine a first risk score of the first terminal device 106a based on a first transaction history of the first terminal device 106a. The first transaction history of the first terminal device 106a may include a count of transactions declined at the first terminal device 106a due to one of a security violation, an invalid merchant identifier, a cryptographic error, or the like. The first transaction history may further include other information such as, but not limited to, a count of chargebacks against transactions performed at the first terminal device 106a, a count of disputed transactions performed at the first terminal device 106a, or the like. Based on the determination of the risk scores, the payment network server 110 transmits a response indicative of the determined risk scores to the user device 104. Consequently, the risk scores are presented to the user 102.

In another example, the service application 116 may allow the user 102 to initiate a second request for obtaining the connectivity scores of one or more terminal devices (for example, the terminal devices 106). On receiving the second request, the payment network server 110 determines the connectivity scores of the terminal devices 106 based on a network connectivity history of each terminal device 106. For example, the payment network server 110 may determine a first connectivity score of the first terminal device 106a based on a first network connectivity history of the first terminal device 106a. The first network connectivity history of the first terminal device 106a may include an offline time duration of the first terminal device 106a and a count of transactions declined by the first acquirer server 108a when the first acquirer server 108a is online. Based on the determination of the connectivity scores, the payment network server 110 transmits a response indicative of the determined connectivity scores to the user device 104. Consequently, the connectivity scores are presented to the user 102.

The issuer server 112 is a computing server that is operated by the issuer. The issuer may be a financial institution that manages payment accounts (e.g., the first payment account) of multiple users (e.g., the user 102). Account details of the payment accounts established with the issuer are stored as account profiles. The issuer server 112 credits and debits the payment accounts based on transactions performed by the users (e.g., the user 102) from the corresponding payment accounts.

The communication network 114 is a medium through which content and messages are transmitted between the user device 104, the terminal devices 106, the acquirer servers 108, the payment network server 110, the issuer server 112, and other entities that are pursuant to one or more standards for the interchange of transaction messages, such as the ISO8583 standard. Examples of the communication network 114 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Figure 13:
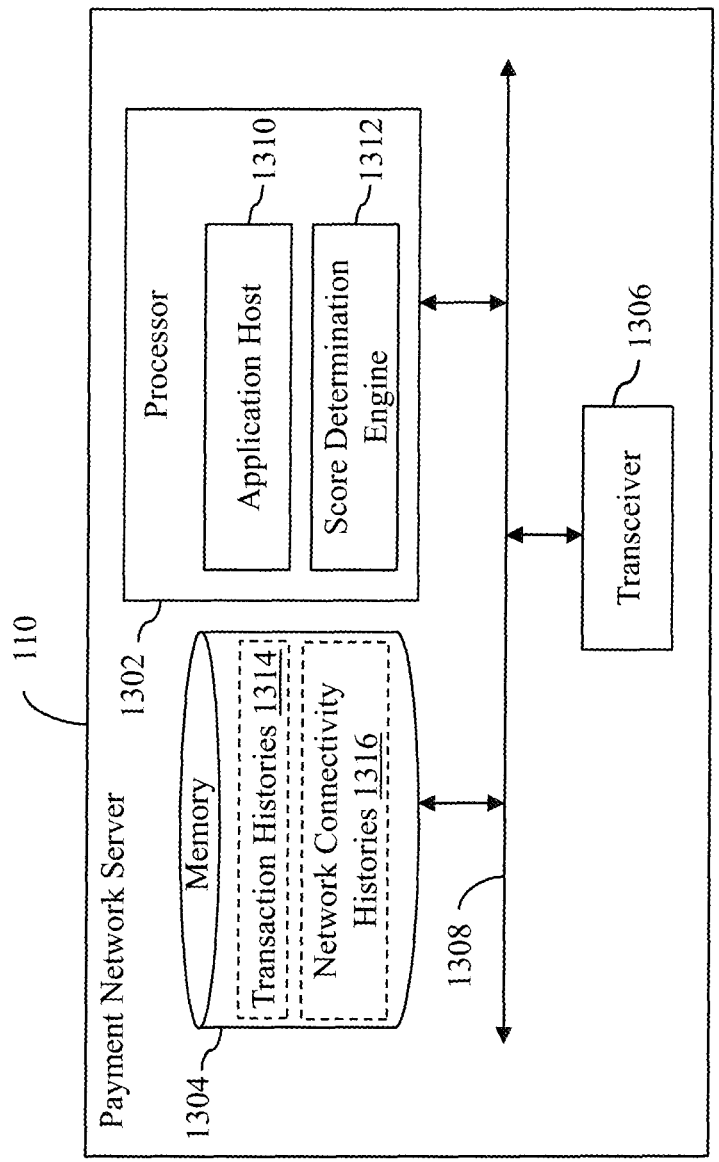
FIG. 13 is a block diagram that illustrates the payment network server of FIG. 1, in accordance with an embodiment of the present invention.

In operation, the user 102 may want to obtain risk scores of one or more terminal devices, prior to performing a transaction. In one embodiment, the user 102 may want to obtain a risk score of a specific terminal device, for example, the first terminal device 106a. For obtaining the risk score of the first terminal device 106a, the user 102 accesses the service application 116 running on the user device 104 and initiates a first request. For initiating the first request, the user 102 specifies a first terminal identifier of the first terminal device 106a. The user device 104 communicates the first request to the payment network server 110 hosting the service application 116. Based on the first request, the payment network server 110 determines the risk score of the first terminal device 106a. The payment network server 110 may determine the risk score of the first terminal device 106a by referring to the first transaction history of the first terminal device 106a. The payment network server 110 then generates a first response to communicate the determined risk score to the user 102. In another embodiment, the user 102 may want to obtain risk scores of terminal devices (for example, the first and second terminal devices 106a and 106b) that are located within a specific geographical area (e.g., within a first distance of a first location). For obtaining the risk scores of terminal devices located within the first distance of the first location, the user 102 accesses the service application 116 and initiates a second request. For initiating the second request, the user 102 specifies the first distance and the first location. The user device 104 communicates the second request to the payment network server 110. Based on the second request, the payment network server 110 identifies the terminal devices (for example, the first and second terminal devices 106a and 106b) that are located within the first distance of the first location and determines the risk scores of the identified terminal devices. The payment network server 110 may refer to the transaction histories (as shown in FIG. 13) of the identified terminal devices for determining the risk scores of the identified terminal devices. The payment network server 110 then generates a second response to communicate the determined risk scores to the user device 104.

The user 102 may further want to obtain connectivity scores of terminal devices, prior to performing the transaction. In one embodiment, the user 102 may want to obtain a connectivity score of a specific terminal device, for example, the first terminal device 106a. For obtaining the connectivity score of the first terminal device 106a, the user 102 accesses the service application 116 running on the user device 104 and initiates a third request. For initiating the third request, the user 102 specifies the first terminal identifier of the first terminal device 106a. The user device 104 communicates the third request to the payment network server 110 hosting the service application 116. Based on the third request, the payment network server 110 determines the connectivity score of the first terminal device 106a. The payment network server 110 may determine the connectivity score of the first terminal device 106a by referring to the first network connectivity history of the first terminal device 106a. The payment network server 110 then generates a third response to communicate the determined connectivity score to the user 102. In another embodiment, the user 102 may want to obtain the connectivity scores of terminal devices (for example, the first and second terminal devices 106a and 106b) that are located within a specific geographical area (e.g., within a second distance of a second location). For obtaining the connectivity scores of the terminal devices located within the second distance of the second location, the user 102 accesses the service application 116 and initiates a fourth request. For initiating the fourth request, the user 102 specifies the second distance and the second location. The user device 104 communicates the fourth request to the payment network server 110. Based on the fourth request, the payment network server 110 identifies the terminal devices (for example, the first and second terminal devices 106a and 106b) that are located within the second distance of the second location and determines the connectivity scores of the identified terminal devices. The payment network server 110 may refer to the network connectivity histories (as shown in FIG. 13) of the identified terminal devices for determining the connectivity scores. The payment network server 110 then generates a fourth response to communicate the determined connectivity scores to the user device 104.

It will be apparent to those of skill in the art that the service application 116 may also be hosted by the first acquirer server 108a, the second acquirer server 108b, or the issuer server 112 without deviating from the scope of the invention. Process of obtaining the risk scores and the connectivity scores is explained in detail in conjunction with FIGS. 5, 7, 8, and 10.

Figure 2:
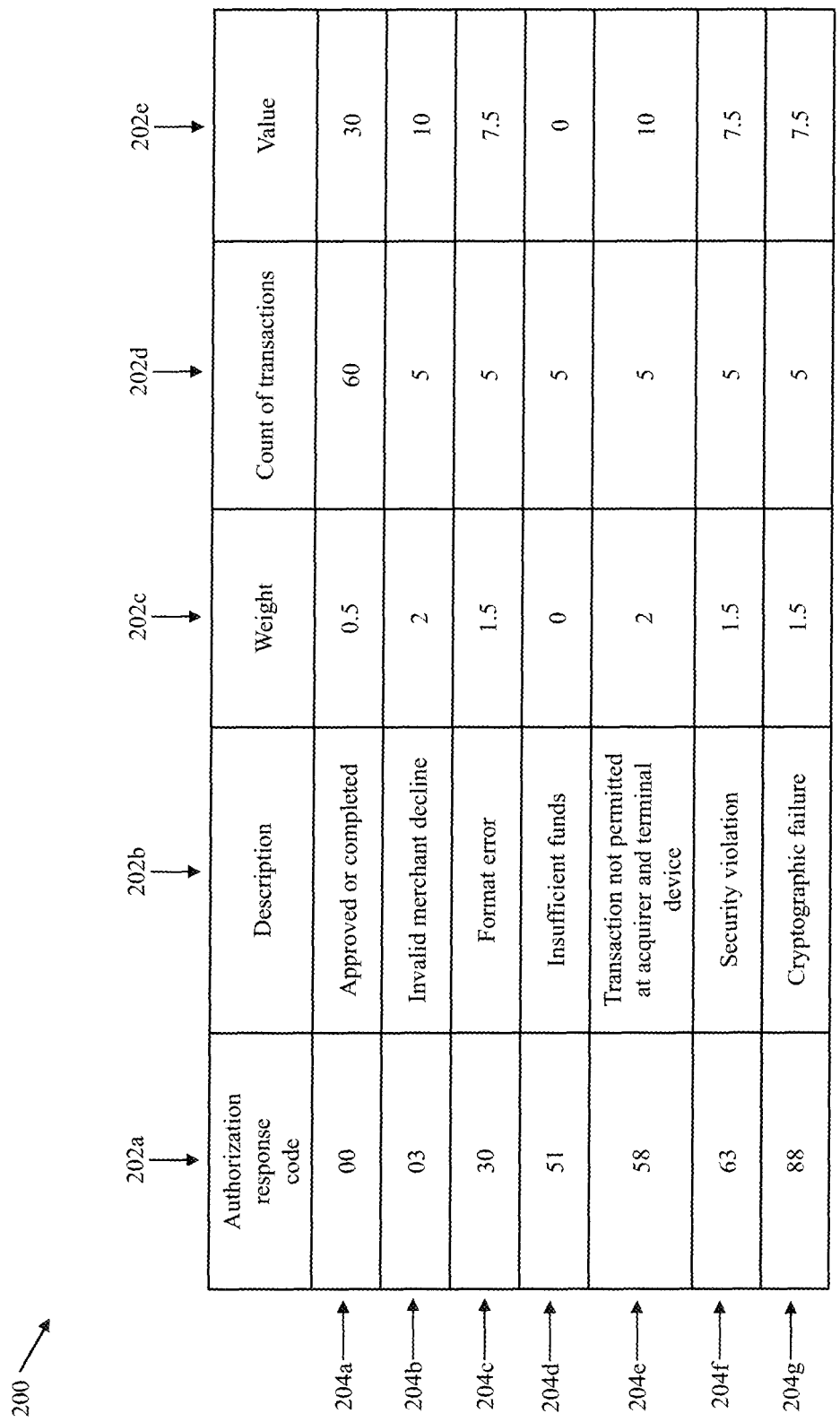
FIG. 2 is a Table that illustrates a first database maintained at a payment network server of FIG. 1, in accordance with an embodiment of the present invention.

FIG. 2 is a Table 200 that illustrates a first database maintained at the payment network server 110, in accordance with an embodiment of the present invention. Table 200 is shown to include first through fifth columns 202a-202e and first through seventh rows 204a-204g. In a non-limiting example, Table 200 pertains to a first part (i.e., authorization response codes) of the first transaction history of the first terminal device 106a. The authorization response codes are part of ISO8583 messaging standard and will be apparent to those of skill in the art. Table 200 is stored in a memory of the payment network server 110.

The first column 202a includes authorization response codes generated by various issuers for transactions initiated at the first terminal device 106a. For example, in response to an authorization request for a transaction initiated at the first terminal device 106a, the issuer server 112 may generate an authorization response. The authorization response includes an authorization response code that indicates whether the transaction is approved or declined. If the transaction is declined, the authorization response code further indicates a reason for declining the transaction. The second column 202b includes descriptions (e.g., interpretations) of the authorization response codes of the first column 202a. Authorization response codes, the descriptions of the authorization response codes, and functions of the authorization response codes are known to those of skill in the art.

The payment network server 110 may assign a weight (i.e., weightage) to each authorization response code of the first column 202a. For example, the payment network server 110 may assign a higher weight to those authorization response codes which indicate a declining of a transaction due to a fault of the first merchant associated with the first terminal device 106a. The third column 202c includes a weight assigned to each authorization response code by the payment network server 110. The fourth column 202d indicates a count of transactions associated with each authorization response code of the first column 202a. In other words, the fourth column 202d indicates a count of transactions for which the issuers (e.g., the issuer server 112) have responded with the corresponding authorization response code. The fifth column 202e includes a value associated with each authorization response code of the first column 202a. The value associated with each authorization response code of the first column 202a is a function of the corresponding weight and the corresponding count of transactions. For example, the value associated with each authorization response code of the first column 202a is a product of the corresponding weight and the corresponding count of transactions.

The first row 204a is indicative of the description, the weightage, the count of transactions, and the value corresponding to a first authorization response code '00'. For example, the first authorization response code '00' indicates an approval or completion of a transaction by a corresponding issuer. The first authorization response code '00' is assigned a weight equal to '0.5' by the payment network server 110. The first row 204a further indicates that the issuers have responded with the first authorization response code '00' for '60' transactions performed at the first terminal device 106a. In other words, '60' transactions performed at the first terminal device 106a have been approved by the issuers (e.g., the issuer server 112). The first authorization response code '00' is associated with a value equal to '30' (i.e., 30=0.5*60).

The second row 204b is indicative of the description, the weight, the count of transactions, and the value corresponding to a second authorization response code '03'. For example, the second authorization response code '03' indicates that a transaction is declined by a corresponding issuer due to an invalid merchant identifier. The second authorization response code '03' is assigned a weight equal to '2' by the payment network server 110. The second row 204b further indicates that the issuers have responded with the second authorization response code '03' for five transactions performed at the first terminal device 106a. The second authorization response code '03' is associated with a value equal to '10' (i.e., 10=2*5).

The third row 204c is indicative of the description, the weight, the count of transactions, and the value corresponding to a third authorization response code '30'. For example, the third authorization response code '30' indicates that a transaction is declined by a corresponding issuer due to an error in the format of a corresponding authorization request. The third authorization response code '30' is assigned a weight equal to '1.5' by the payment network server 110. The third row 204c further indicates that the issuers have responded with the third authorization response code '30' for five transactions performed at the first terminal device 106a. The third authorization response code '30' is associated with a value equal to '7.5' (i.e., 7.5=1.5*5).

The fourth row 204d is indicative of the description, the weight, the count of transactions, and the value corresponding to a fourth authorization response code '51'. For example, the fourth authorization response code '51' indicates that a transaction is declined by a corresponding issuer due to insufficient funds in a payment account of a user associated with the transaction. The fourth authorization response code '51' is assigned a weight equal to '0' by the payment network server 110. The due to insufficient funds in a payment account of a user associated with the transaction row 204d further indicates that the issuers have responded with the fourth authorization response code '51' for five transactions performed at the first terminal device 106a. The fourth authorization response code '51' is associated with a value equal to '0' (i.e., 0=0*5).

The fifth row 204e is indicative of the description, the weight, the count of transactions, and the value corresponding to a fifth authorization response code '58'. For example, the fifth authorization response code '58' indicates that a transaction is declined by a corresponding issuer as the transaction may not permitted at the first terminal device 106a. The fifth authorization response code '58' is assigned a weight equal to '2' by the payment network server 110. The fifth row 204e further indicates that the issuers have responded with the fifth authorization response code '58' for five transactions performed at the first terminal device 106a. The fifth authorization response code '58' is associated with a value equal to '10' (i.e., 10=2*5).

The sixth row 204f is indicative of the description, the weight, the count of transactions, and the value corresponding to a sixth authorization response code '63'. For example, the sixth authorization response code '63' indicates that a transaction is declined by a corresponding issuer due to a security violation. The sixth authorization response code '63' is assigned a weight equal to '1.5' by the payment network server 110. The sixth row 204f further indicates that the issuers have responded with the sixth authorization response code '63' for five transactions performed at the first terminal device 106a. The sixth authorization response code '63' is associated with a value equal to '7.5' (i.e., 7.5=1.5*5).

The seventh row 204g is indicative of the description, the weight, the count of transactions, and the value corresponding to a seventh authorization response code '88'. For example, the seventh authorization response code '88' indicates that a transaction is declined by a corresponding issuer due to a cryptographic failure. The seventh authorization response code '88' is assigned a weight equal to '1.5' by the payment network server 110. The seventh row 204g further indicates that the issuers have responded with the seventh authorization response code '88' for five transactions performed at the first terminal device 106a. The seventh authorization response code '88' is associated with a value equal to '7.5' (i.e., 7.5=1.5*5).

It will be apparent to those of ordinary skill in the art that the authorization response codes illustrated in Table 200 are mere examples and that the Table 200 may include other authorization response codes that are known in the art without deviating from the scope of the invention. The weights assigned to the authorization response codes of the first column 202a are arbitrary and may have different values based on a discretion of the payment network server 110. The payment network server 110 may further maintain databases similar to the first database for other terminal devices 106 without deviating from the scope of the invention.

Figure 3:
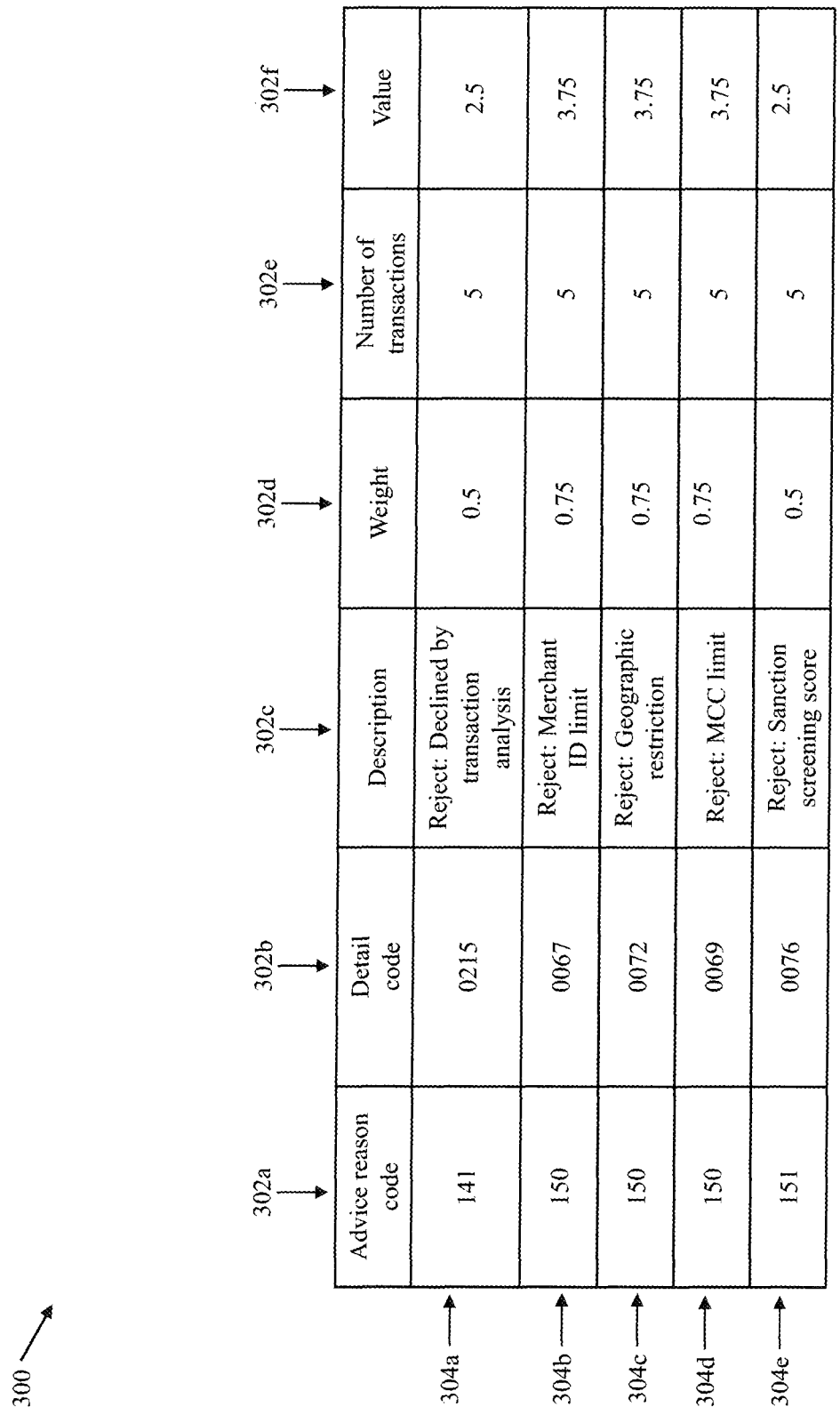
FIG. 3 is a Table that illustrates a second database maintained at the payment network server of FIG. 1, in accordance with an embodiment of the present invention.

FIG. 3 is a Table 300 that illustrates a second database maintained at the payment network server 110, in accordance with an embodiment of the present invention. Table 300 is shown to include sixth through eleventh columns 302a-302f and eighth through twelfth rows 304a-304g. In a non-limiting example, Table 300 pertains to a second part (i.e., advice reason codes for debit card transactions) of the first transaction history of the first terminal device 106a. The advice reason codes are part of the ISO8583 messaging standard and will be apparent to those of skill in the art. The advice reason codes may be included within a financial transaction advice message (e.g., message type '0220'), a transaction reversal advice message (e.g., message type '0420' or message type '0422'), or the like.

The sixth column 302a includes advice reason codes generated by one of the first acquirer server 108a, the payment network server 110, or issuer servers (e.g., the issuer server 112) for transactions initiated at the first terminal device 106a. Each advice reason code is associated with one or more detail codes. The seventh column 302b includes a detail code associated with the corresponding advice reason code of the sixth column 302a. The eighth column 302c includes a description for a combination of the advice reason code and the detail code of the sixth and seventh columns 302a and 302b, respectively.

The payment network server 110 may assign a weight to each combination of the advice reason code and the detail code of the sixth and seventh columns 302a and 302b, respectively. The ninth column 302d indicates a weight (i.e., weightage) assigned to each combination. The weight assigned to each combination is arbitrary and may have different values based on a discretion of the payment network server 110. The tenth column 302e includes a count of transactions associated with each combination of the advice reason code and the detail code of the sixth and seventh columns 302a and 302b, respectively. The eleventh column 302f includes a value associated with each combination of the advice reason code and the detail code of the sixth and seventh columns 302a and 302b, respectively. The value associated with each combination of the advice reason code and the detail code of the sixth and seventh columns 302a and 302b, respectively, is a function of the corresponding weight and the corresponding count of transactions. For example, the value associated with each combination of the advice reason code and the detail code of the sixth and seventh columns 302a and 302b, respectively, is a product of the corresponding weight and the count of transactions.

The eighth row 304a is indicative of the description, the weight, the count of transactions, and the value corresponding to a first combination of a first advice reason code '141' and a first detail code '0215'. For example, the first combination of the first advice reason code '141' and the first detail code '0215' indicates an advice for rejecting a transaction on the grounds of transaction analysis. The first combination may be assigned a weight equal to '0.5'. The eighth row 304a further indicates that five transactions, performed at the first terminal device 106a, are associated with the first combination. Thus, the first combination is assigned a value equal to '2.5' (i.e., 2.5=0.5*5).

The ninth row 304b is indicative of the description, the weight, the count of transactions, and the value corresponding to a second combination of a second advice reason code '150' and a second detail code '0067'. For example, the second combination of the second advice reason code '150' and the second detail code '0215' indicates an advice for rejecting a transaction due to a limit on merchant ID of the first merchant. The second combination may be assigned a weight equal to '0.75'. The ninth row 304b further indicates that five transactions, performed at the first terminal device 106a, are associated with the second combination. Thus, the second combination is assigned a value equal to '3.75' (i.e., 3.75=0.75*5).

The tenth row 304c is indicative of the description, the weight, the count of transactions, and the value corresponding to a third combination of the second advice reason code '150' and a third detail code '0072'. For example, the third combination of the second advice reason code '150' and the third detail code '0072' indicates an advice for rejecting a transaction due to a geographic restriction. The third combination may be assigned a weight equal to '0.75'. The tenth row 304c further indicates that five transactions, performed at the first terminal device 106a, are associated with the third combination. Thus, the third combination is assigned a value equal to '3.75' (i.e., 3.75=0.75*5).

The eleventh row 304d is indicative of the description, the weight, the count of transactions, and the value corresponding to a fourth combination of the second advice reason code '150' and a fourth detail code '0069'. For example, the fourth combination of the second advice reason code '150' and the fourth detail code '0069' indicates an advice for rejecting a transaction due to a limit on a merchant category code (MCC) of the first merchant. The fourth combination may be assigned a weight equal to '0.75'. The eleventh row 304d further indicates that five transactions, performed at the first terminal device 106a, are associated with the fourth combination. Thus, the fourth combination is assigned a value equal to '3.75' (i.e., 3.75=0.75*5).

The twelfth row 304e is indicative of the description, the weight, the count of transactions, and the value corresponding to a fifth combination of a third advice reason code '151' and a fifth detail code '0076'. For example, the fifth combination of the third advice reason code '151' and the fifth detail code '0076' indicates an advice for rejecting a transaction due to a sanction screening score. The fifth combination may be assigned a weight equal to '0.5'. The twelfth row 304e further indicates that five transactions, performed at the first terminal device 106a, are associated with the fifth combination. Thus, the fifth combination is assigned a value equal to '0.5' (i.e., 2.5=0.5*5).

It will be apparent to those of ordinary skill in the art that the payment network server 110 may maintain a similar database pertaining to credit card transactions (i.e., dual message processing) performed at the first terminal device 106a. Further, the advice reason codes included in the sixth column 302a are mere examples and the Table 300 may include other advice reason codes that are known to those of skill in the art.

Figure 4:
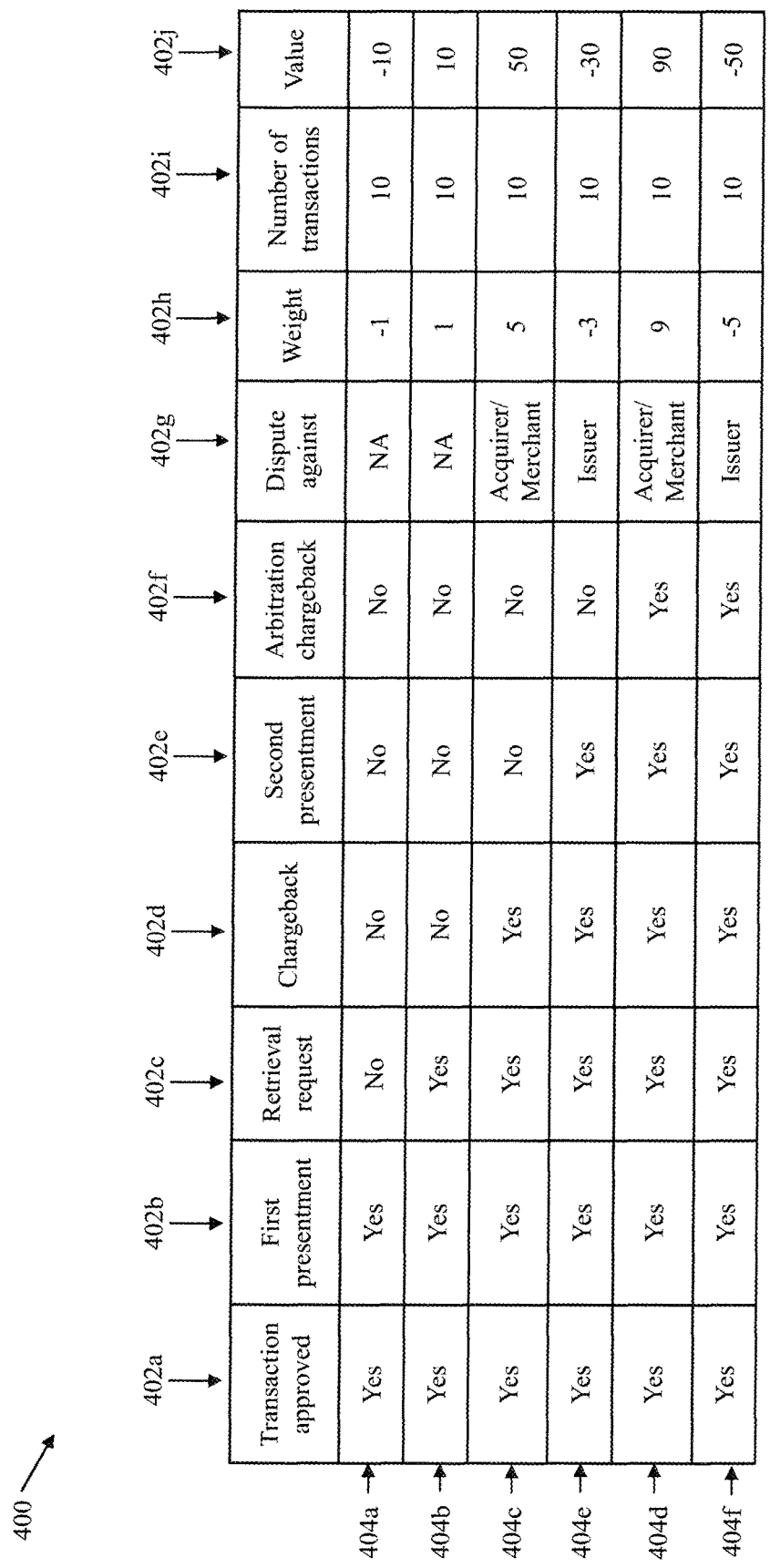
FIG. 4 is a Table that illustrates a third database maintained at the payment network server of FIG. 1, in accordance with an embodiment of the present invention.

FIG. 4 is a Table 400 that illustrates a third database maintained at the payment network server 110, in accordance with an embodiment of the present invention. Table 400 is shown to include twelfth through twenty first columns 402a-402j and thirteenth through eighteenth rows 404a-404f. In a non-limiting example, Table 400 pertains to a third part (i.e., clearing data) of the first transaction history of the first terminal device 106a.

Processing of transactions may involve various stages such as approval or completion of the transactions and submission of clearing records (i.e., first presentments). In a scenario where a transaction is subject to a discrepancy and/or a dispute, the processing of the transaction may further involve additional stages such as filing of retrieval or fulfilment requests, filing of chargebacks, submission of second presentments, and/or arbitration. Clearing of a transaction is subject to approval or completion of the transaction by a corresponding issuer (e.g., the issuer server 112). The transaction may be concluded after the submission of the clearing records by the first acquirer server 108a to the issuer associated with the transaction. In some scenarios, a user (e.g., the user 102) associated with the transaction may dispute the transaction. For example, the user 102 may dispute a transaction if the transaction is fraudulent or if the first merchant has not delivered goods or services purchased by the user 102. For disputing the transaction performed at the first terminal device 106a, the user 102 may contact an issuer (e.g., the issuer server 112) associated with the transaction and request a refund (i.e., the user 102 files a request for a chargeback for the transaction).

The issuer server 112 may communicate a reason code to the first acquirer server 108a, based on why the user 102 is disputing the transaction. For example, the issuer server 112 may communicate, to the first acquirer server 108a by way of the payment network server 110, a reason code '4515' to indicate that the user 102 denies performing the transaction. In other words, the reason code '4515' implies that the transaction may be fraudulent. A chargeback (i.e., a reversal of the transaction) may be initiated based on the reason code, debiting an amount equal to a transaction amount of the transaction from the first merchant account of the first merchant and crediting the transaction amount to the first payment account. The first merchant may be notified of the chargeback by the first acquirer server 108a. The first merchant may accept the chargeback if the first merchant determines the transaction as fraudulent. But, if the first merchant deems the chargeback as illegitimate or unwarranted (i.e., if the first merchant determines that the transaction is genuine), the first merchant may communicate with the first acquirer server 108a to present, to the payment network server 110 and/or the issuer server 112, an evidence or documentation of the transaction to prove an authenticity of the transaction (i.e., second presentment). The presentation of the evidence, the clearing of the transaction, and/or, resolution of disputes pertaining to the transaction are well known to those of skill in the art.

The twelfth column 402a indicates whether the transactions performed at the first terminal device 106a are approved or completed. The thirteenth column 402b indicates whether first presentments have been made for the transactions performed at the first terminal device 106a. The fourteenth column 402c indicates whether any issuer or user corresponding to the transactions performed at the first terminal device 106a has initiated retrieval or fulfilment requests for the transactions. The issuers or the users may initiate the retrieval or fulfilment requests for requesting information regarding the transactions. The fifteenth column 402d indicates whether chargebacks have been initiated against the transactions performed at the first terminal device 106a. The sixteenth column 402e indicates whether second presentments have been made for the transactions performed at the first terminal device 106a. The seventeenth column 402f indicates whether arbitration chargebacks have been initiated against the transactions performed at the first terminal device 106a. The eighteenth column 402g indicates an entity against which the dispute is filed. The nineteenth column 402h indicates weights assigned to various processing stages represented by the thirteenth through eighteenth rows 404a-404f. The weight assigned to each processing stage is arbitrary and may have different values based on a discretion of the payment network server 110. The twentieth column 402i indicates a count of transactions associated with each processing stage. The twenty first column 402j indicates a value associated with each processing stage. The value associated with a processing stage is a product of the count of transactions associated with the corresponding processing stage and the weight associated with the corresponding processing stage.

The thirteenth row 404a indicates that ten transactions performed at the first terminal device 106a are currently at a first processing stage, i.e., the ten transactions have been approved or completed and first presentments have been submitted by the first acquirer server 108a. The first processing stage is associated with a weight equal to '−1' and a value equal to '−10' (i.e., −10=−1*10). The fourteenth row 404b indicates that ten transactions performed at the first terminal device 106a are currently at a second processing stage, i.e., issuers or users corresponding to the ten transactions have filed retrieval requests for the ten transactions. The second processing stage is associated with a weight equal to '1' and a value equal to '10' (i.e., 10=1*10). The fifteenth row 404c indicates that ten transactions performed at the first terminal device 106a are currently at a third processing stage, i.e., issuers corresponding to the ten transactions have initiated chargebacks against the ten transactions. The initiation of the chargebacks implies that disputes are filed against the first merchant and/or the first acquirer. The third processing stage is associated with a weight equal to '5' and a value equal to '50' (i.e., 50=5*10). The sixteenth row 404d indicates that ten transactions performed at the first terminal device 106a are currently at a fourth processing stage, i.e., the first merchant and/or the first acquirer have made second presentments for the ten transactions. The submission of the second presentments implies that disputes are filed against the issuers corresponding to the ten transactions. The fourth processing stage is associated with a weight equal to '−3' and a value equal to '−30' (i.e., −30=−3*10). The seventeenth row 404e indicates that ten transactions performed at the first terminal device 106a are currently at a fifth processing stage, i.e., arbitration. The seventeenth row 404e indicates a scenario wherein arbitration is settled in favor of the issuers or users corresponding to the ten transactions. The fifth processing stage is associated with a weight equal to '9' and a value equal to '90' (i.e., 90=9*10). The eighteenth row 404f indicates that ten transactions performed at the first terminal device 106a are currently at the fifth processing stage, i.e., arbitration. The eighteenth row 404f indicates a scenario wherein arbitration is settled in favor of the first acquirer and/or the first merchant. The fifth processing stage is associated with a weight equal to '−5' and a value equal to '−5' (i.e., −50=−5*10).

It will be apparent to those of ordinary skill in the art that the payment network server 110 may maintain a similar database pertaining to other terminal devices 106. Further, the clearing data in Table 400 is shown for exemplary purposes and should not be construed to limit the scope of the invention.

Figure 5:
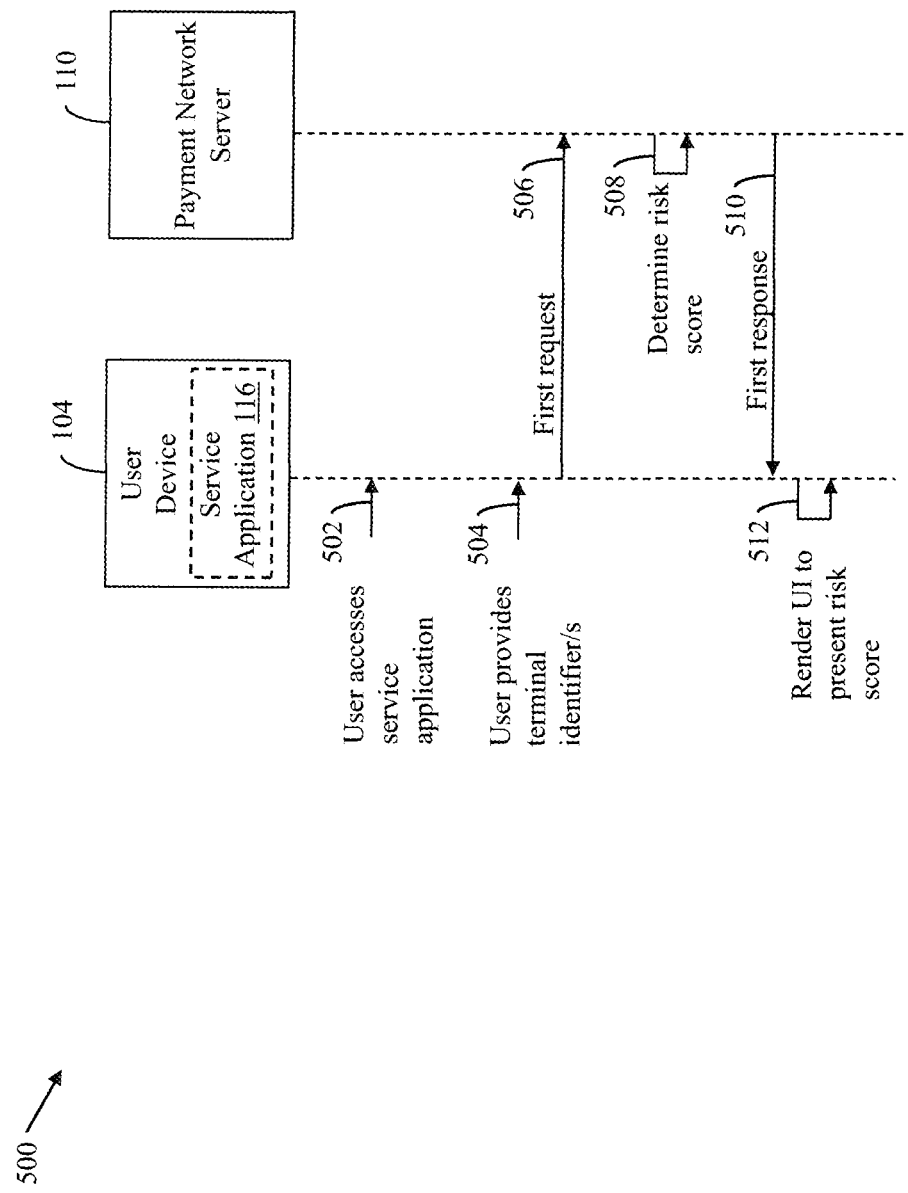
FIG. 5 represents a process flow diagram that illustrates an exemplary scenario for obtaining a risk score of a specific terminal device, in accordance with an embodiment of the present invention.

FIG. 5 represents a process flow diagram 500 that illustrates an exemplary scenario for obtaining a risk score of a specific terminal device, in accordance with an embodiment of the present invention. The process flow diagram 500 involves the user device 104 and the payment network server 110.

When the user 102 wants to obtain the risk score of the first terminal device 106a (e.g., the specific terminal device), the user 102 accesses the service application 116 that runs on the user device 104 (as shown by arrow 502). The service application 116 renders a UI on a display of the user device 104. The user 102 provides the first terminal identifier of the first terminal device 106a to the service application 116 and initiates the first request to obtain the risk score of the first terminal device 106a (as shown by arrow 504). Examples of the first terminal identifier may include, but are not limited to, an alphanumeric code, a quick response (QR) code, a barcode, or the like. The user 102 may provide the first terminal identifier by using a variety of methods. In one example, the user 102 may manually enter the first terminal identifier through the UI. In another example, the user 102 may use the user device 104 to scan the first terminal identifier displayed on the first terminal device 106a. The user device 104 generates and communicates the first request to the payment network server 110 by way of the service application 116 (as shown by arrow 506). The first request includes the first terminal identifier provided by the user 102.

Based on the first request, the payment network server 110 determines a first risk score of the first terminal device 106a (as shown by arrow 508). For determining the first risk score, the payment network server 110 retrieves the first transaction history of the first terminal device 106a from its memory by using the first terminal identifier. In other words, the payment network server 110 retrieves the first through third databases (i.e., Tables 200, 300, and 400) from its memory by using the first terminal identifier. By referring Table 200, the payment network server 110 determines a first cumulative value associated with the first terminal device 106a. The first cumulative value is a sum of the values indicated by the fifth column 202e. In this scenario, the first cumulative value is equal to '72.5' (i.e., 72.5=30+10+7.5+ 0+10+7.5+7.5). The payment network server 110 then determines a first average cumulative value (ACV1) based on equation 1, shown below:

$$ACV1 = \frac{\text{First cumulative value}}{\text{Total count of transactions associated with first cumulative value}} \quad (1)$$

The total count of transactions associated with the first cumulative value is equal to '90' (i.e., 90=60+5+5+5+5+5). Therefore, the first average cumulative value (ACV1) is equal to '0.805' (i.e., 0.805=72.5/90). By referring Table 300, the payment network server 110 then determines a second cumulative value for the first terminal device 106a. The second cumulative value is a sum of the values indicated by the eleventh column 302f. Therefore, the second cumulative value is equal to '16.25' (i.e., 16.25=2.5+3.75+3.75+ 3.75+2.5). The payment network server 110, then, determines a second average cumulative value (ACV2) based on equation 2, shown below:

$$ACV2 = \frac{\text{Second cumulative value}}{\text{Total count of transactions associated with second cumulative value}} \quad (2)$$

The total count of transactions associated with the second cumulative value is equal to '25' (i.e., 25=5+5+5+5+5). Therefore, the second average cumulative value (ACV2) is '0.65' (i.e., 0.65=16.25/25). Based on Table 400, the payment network server 110 then determines a third cumulative value for the first terminal device 106a. The third cumulative value is a sum of the values indicated by the twenty first column 402j. Therefore, the third cumulative value is equal to '60' (i.e., 60=–10+10+50+–30+90+–50). The payment network server 110, then, determines a third average cumulative value (ACV3) based on equation 3, shown below:

$$ACV3 = \frac{\text{Third cumulative value}}{\text{Total count of transactions associated with third cumulative value}} \quad (3)$$

The total count of transactions associated with the third cumulative value is equal to '60' (i.e., 60=10+10+10+10+ 10+10). Therefore, the third average cumulative value (ACV3) is equal to '1' (i.e., 1=60/60). Based on the first through third average cumulative values (ACV1, ACV2, and ACV3), the payment network server 110 determines the first risk score. For example, the payment network server 110 determines the first risk score based on equation 4, shown below:

$$\text{Score}_{risk} = \text{sum of average cumulative values} * 100 \quad (4)$$

where,
$\text{Score}_{risk}$ indicates a risk score of a terminal device; and sum of average cumulative values is a sum of the first through third average cumulative values (ACV1, ACV2, and ACV3).

Therefore, the first risk score is equal to '245.5' (i.e., 245.5=(0.805+1+0.65)*100). The first risk score indicates a measure of risk associated with performing a transaction at the first terminal device 106a. The payment network server 110 further defines risk score ranges such that each risk score range is indicative of a level of risk associated with performing a transaction at a terminal device (e.g., the first terminal device 106a). An exemplary Table 600 is shown in FIG. 6 to illustrate the risk score ranges defined by the payment network server 110.

Figure 6:
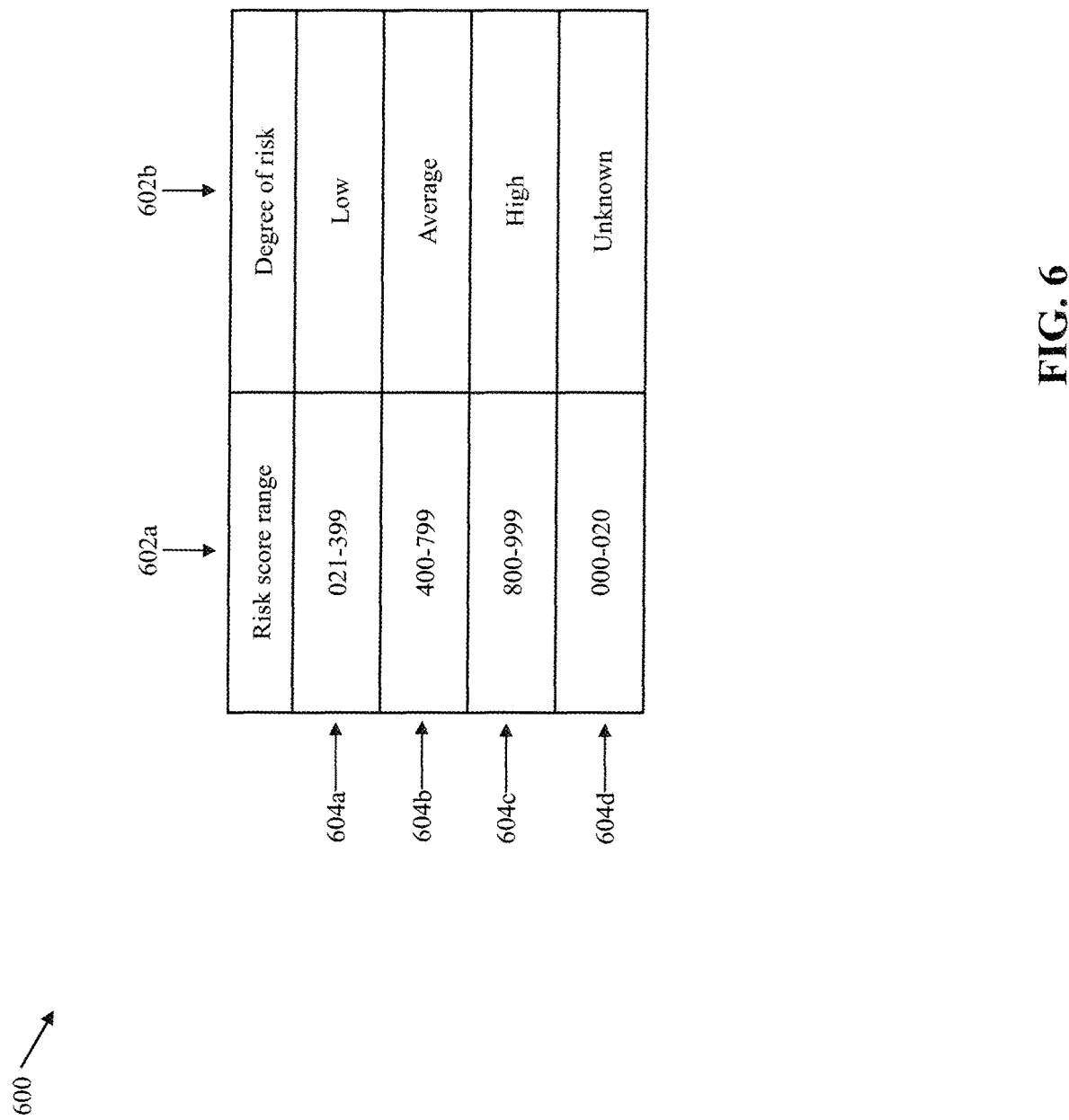
FIG. 6 is a Table that illustrates exemplary risk score ranges defined by the payment network server of FIG. 1, in accordance with an embodiment of the present invention.

With reference to FIG. 6, Table 600 illustrates the risk score ranges defined by the payment network server 110. Table 600 is shown to include twenty second and twenty third columns 602a and 602b and nineteenth to twenty second rows 604a-604d. Table 600 may be stored in the memory of the payment network server 110. The twenty second column 602a indicates the risk score ranges defined by the payment network server 110 and the twenty third column 602b indicates the levels of risk corresponding to the risk score ranges of the twenty second column 602a. The nineteenth row 604a indicates that a low level of risk is associated with performing a transaction at a terminal device (e.g., the first terminal device 106a) if a risk score of the terminal device is within a risk score range '021-399'. The twentieth row 604b indicates that an average level of risk is associated with performing a transaction at a terminal device (e.g., the first terminal device 106a) if a risk score of the terminal device is within a risk score range '400-799'. The twenty first row 604c indicates that a high level of risk is associated with performing a transaction at a terminal device (e.g., the first terminal device 106a) if a risk score of the terminal device is within a risk score range '800-999'. The twenty second row 604d indicates that an unknown level of risk is associated with performing a transaction at a terminal device (e.g., the first terminal device 106a) if a risk score of the terminal device is within a risk score range '000-020'. The level of risk may be unknown if the terminal device is new or if information regarding a transaction history of the terminal device is insufficient to determine the risk score. It will be apparent to those of skill in the art that the risk score ranges shown in Table 600 are mere examples and that the risk score ranges may be changed and/or updated by the payment network server 110 dynamically.

Referring now to FIG. 5, the payment network server 110 determines that a level of risk associated with performing a transaction at the first terminal device 106a is low as the first risk score is '245.5'. Based on the determination of the first risk score, the payment network server 110 transmits the first response to the user device 104 (as shown by arrow 510). The first response is indicative of the first risk score and the level of risk associated with performing a transaction at the first terminal device 104. The service application 116 may present the first risk score on the rendered UI (as shown by arrow 512). Further, the service application 116 may display a message indicating the level of risk associated with performing a transaction at the first terminal device 106a.

In another embodiment, the user 102 may initiate another request for obtaining risk scores of multiple terminal devices by providing terminal identifiers of the terminal devices. In such a scenario, the payment network server 110 may determine the risk scores of the terminal devices, based on the request. In another embodiment, the payment network server 110 may determine a first safety score for the first terminal device 106a, instead of the first risk score. The first safety score may indicate a measure of safety associated with performing a transaction at the first terminal device 106a. It will be apparent to those of skill in the art that the first safety score may be a complement of the first risk score.

It will be apparent to those of skill in the art that second through fourth risk scores of the second through fourth terminal devices 106b-106d may be determined in a similar manner as determined for the first terminal device 106a.

Figure 7:
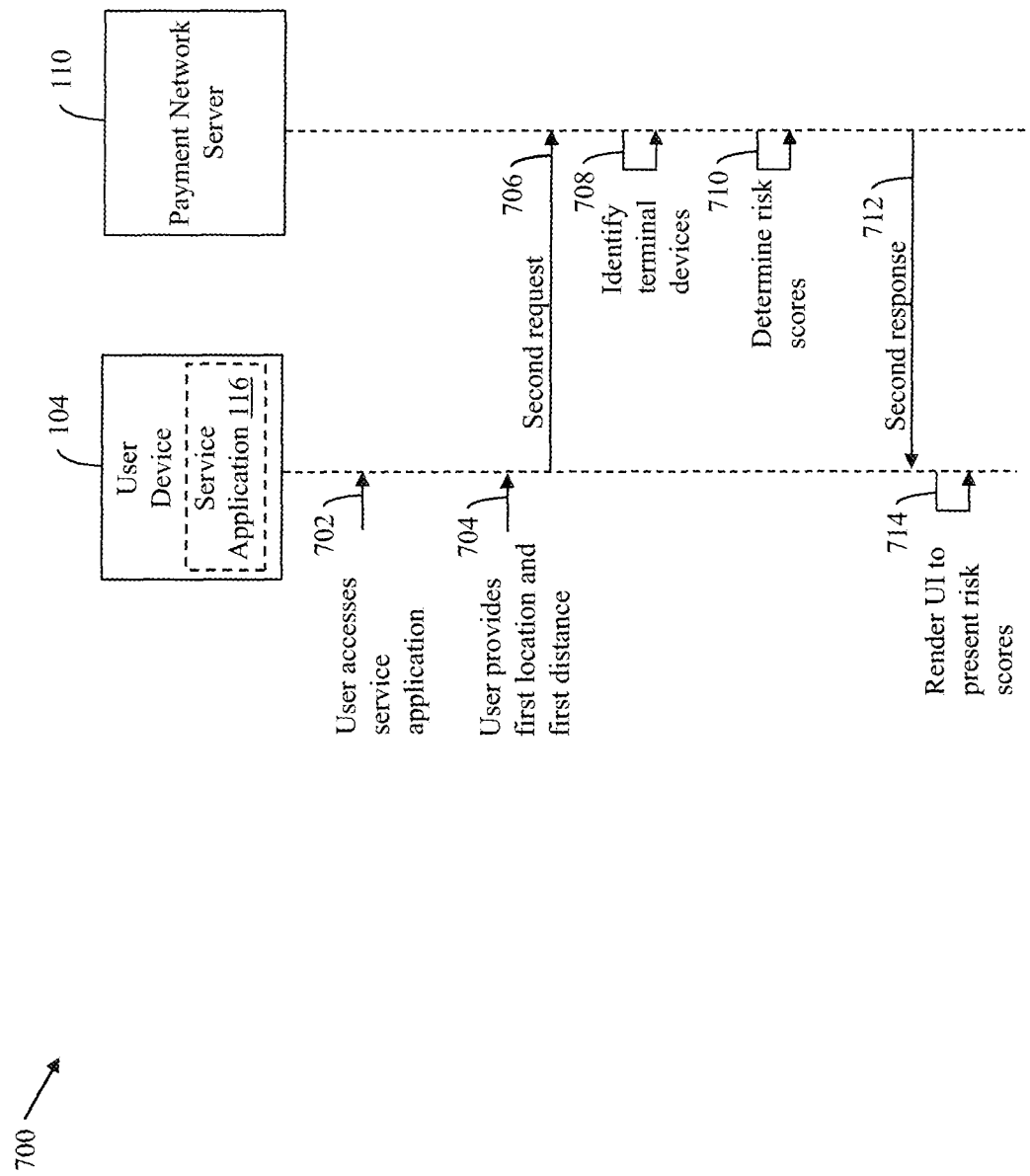
FIG. 7 represents a process flow diagram that illustrates an exemplary scenario for obtaining risk scores of terminal devices that are located within a specific geographical area, in accordance with an embodiment of the present invention.

FIG. 7 represents a process flow diagram 700 that illustrates an exemplary scenario for obtaining risk scores of terminal devices that are located within a specific geographical area, in accordance with an embodiment of the present invention. The process flow diagram 700 involves the user device 104 and the payment network server 110.

When the user 102 wants to obtain risk scores of terminal devices that are located within the specific geographical area (e.g., within a first distance of a first location), the user 102 accesses the service application 116 that runs on the user device 104 (as shown by arrow 702). The service application 116 renders the UI on the user device 104. The user 102 provides information pertaining to the first distance and the first location in the UI and initiates the second request to obtain the risk scores of the terminal devices that are located within the first distance of the first location (as shown by arrow 704). In one exemplary scenario, the user 102 may want to obtain risk scores of terminal devices at pharmaceutical stores located within the first distance of the first location. In such a scenario, the user 102 may further specify a merchant category or an MCC of the pharmaceutical stores along with the first distance and the first location. The user device 104 generates and communicates the second request to the payment network server 110 by way of the service application 116 (as shown by arrow 706). The second request is indicative of the first distance and the first location. In one embodiment, the second request may further include a first merchant category specified by the user 102. Based on the second request, the payment network server 110 identifies terminal devices (for example, the first through third terminal devices 106a-106c) that correspond to the first merchant category and are located within the first distance of the first location (as shown by arrow 708).

After the identification of the first through third terminal devices 106a-106c, the payment network server 110 determines the first risk score, a second risk score, and a third risk score of the first through third terminal devices 106a-106c, respectively (as shown by arrow 710). The determination of the first risk score is explained in the foregoing description of FIG. 5. The payment network server 110 may determine the second and third risk scores in a manner similar to the determination of the first risk score, based on second and third transaction histories of the second and third terminal devices 106b and 106c, respectively. The payment network server 110 generates and transmits the second response to the user device 104 (as shown by arrow 712). The second response is indicative of the first, second, and third risk scores and levels of risks associated with performing transactions at the first through third terminal devices 106a-106c, respectively. The service application 116 displays the first, second, and third risk scores on the rendered UI (as shown by arrow 714). Further, the service application 116 may display a message indicating the levels of risks associated with performing transactions at the first through third terminal devices 106a-106c. In another embodiment, the second response may also include information regarding payment networks supported by the first through third terminal devices 106a-106c and/or acquirers (e.g., the first acquirer or the second acquirer) associated with the first through third terminal devices 106a-106c.

Figure 8:
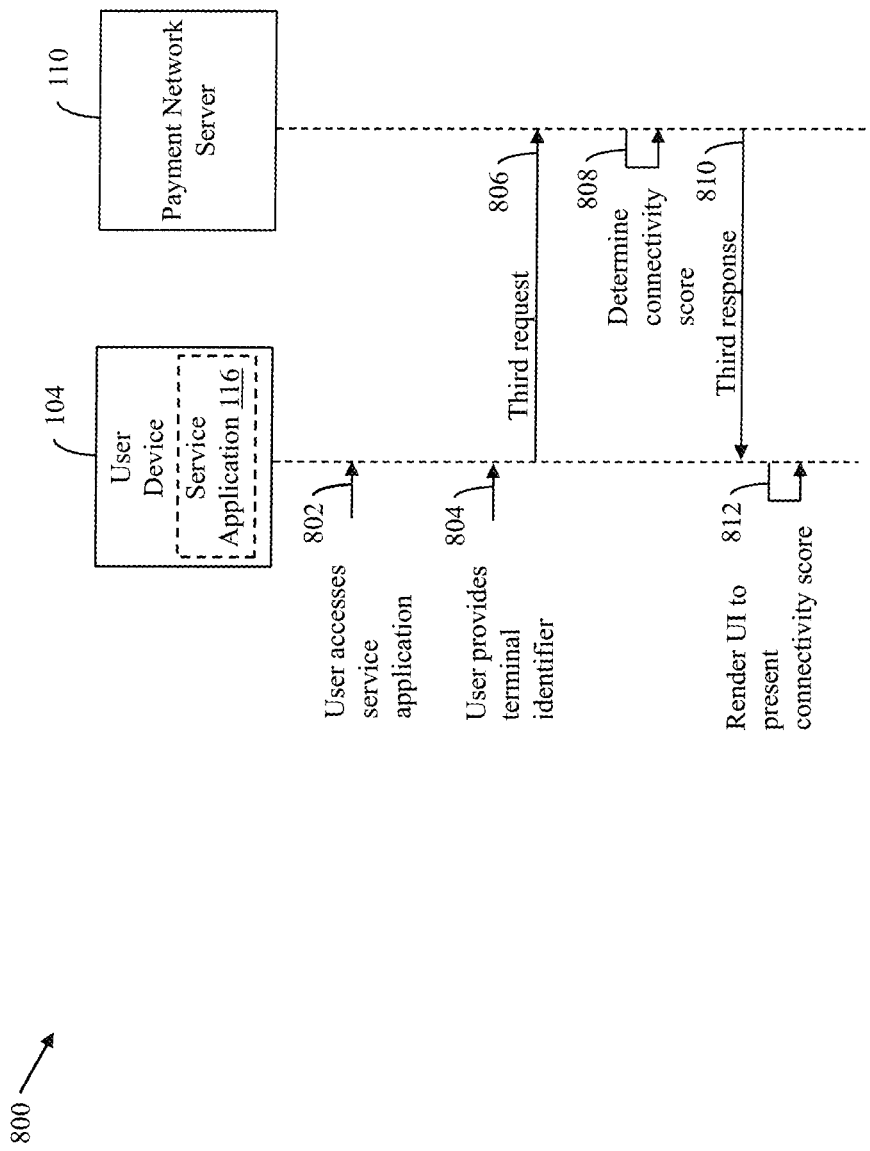
FIG. 8 represents a process flow diagram that illustrates an exemplary scenario for obtaining a connectivity score of a specific terminal device, in accordance with an embodiment of the present invention.

FIG. 8 represents a process flow diagram 800 that illustrates an exemplary scenario for obtaining a connectivity score of a specific terminal device, in accordance with an embodiment of the present invention. The process flow diagram 800 involves the user device 104 and the payment network server 110.

When the user 102 wants to obtain the connectivity score of the first terminal device 106a (i.e., the specific terminal device), the user 102 accesses the service application 116 that runs on the user device 104 (as shown by arrow 802). The service application 116 renders the UI on the display of the user device 104. The user 102 provides the first terminal identifier of the first terminal device 106a to the service application 116 and initiates a third request to obtain the connectivity score of the first terminal device 106a (as shown by arrow 804). The user device 104 generates and communicates the third request to the payment network server 110 by way of the service application 116 (as shown by arrow 806). The third request is indicative of the first terminal identifier. Based on the third request, the payment network server 110 retrieves the first network connectivity history of the first terminal device 106a from its memory by using the first terminal identifier.

The first network connectivity history of the first terminal device 106a is maintained at the payment network server 110. The first network connectivity history includes an offline time duration of the first acquirer server 108a, a count of transactions declined by the first acquirer server 108a when the first acquirer server 108a is online, or the like. The offline time duration is a duration for which the first acquirer server 108a was not available for accepting transaction messages. The offline time duration may be determined based on sign-in and sign out messages communicated by the first acquirer server 108a to the payment network server 110. The first acquirer server 108a may communicate a sign-in message to the payment network server 110 whenever the first acquirer server 108a becomes available (i.e., when the first acquirer server 108a goes online) for accepting transaction messages. Similarly, the first acquirer server 108a may communicate a sign-out message to the payment network server 110 whenever the first acquirer server 108a becomes unavailable (i.e., when the first acquirer server 108a goes offline) for accepting transaction messages. No transactions may be performed at the first terminal device 106a when the first acquirer server 108a is offline. In other words, the first terminal device 106a is offline or online based on whether the first acquirer server 108a is offline or online, respectively. A transaction that is performed at the first terminal device 106a, when the first acquirer server 108a is offline, may fail. The time duration between a sign-out message and a sign-in that follows the sign-out message is referred to as 'the offline time duration'. The transactions declined by the first acquirer server 108a when the first acquirer server 108a is online may be due to connection failures. The connection failures may be caused due to network outages between the payment network server 110 and the first acquirer server 108a or between the first terminal device 106a and the first acquirer server 108a. Hereinafter, the count of transactions that failed due to connection failures is referred to as 'count of failed transactions'.

Based on the first network connectivity history of the first terminal device 106a, the payment network server 110 determines a first total offline time duration for the first terminal device 106a. The first total offline time duration is a sum of offline time durations of the first acquirer server 108a over a first time period (for example, a day, a week, a month, or the like). In a non-limiting example, it is assumed that the first total offline time duration of the first terminal device 106a in one day is '2' hours. Based on the first network connectivity history of the first terminal device 106a, the payment network server 110 further determines the count of failed transactions. In a non-limiting example, it is assumed that the count of failed transactions at the first terminal device 106a is '30'. The payment network server 110 may further determine a total outage time based on the count of failed transactions. For example, when each failed transaction is equivalent to one minute of outage time, the total outage time is equal to '0.5' hours (i.e., 0.5=1*30/60).

Based on the first total offline time duration and the total outage time, the payment network server 110 determines the first connectivity score of the first terminal device 106a (as shown by arrow 808). In one example, the payment network server 110 determines the first connectivity score based on equation 5, shown below:

$$Score_{connectivity} = \frac{(T_{ideal} - T_{offline} - T_{outage}) * 100}{T_{ideal}} \quad (5)$$

where, $Score_{connectivity}$ indicates a connectivity score of a terminal device;

$T_{ideal}$ indicates an ideal online time duration in the first time period;

$T_{offline}$ indicates the total offline time duration in the first time period; and $T_{outage}$ indicates the total outage time in the first time period.

Figure 9:
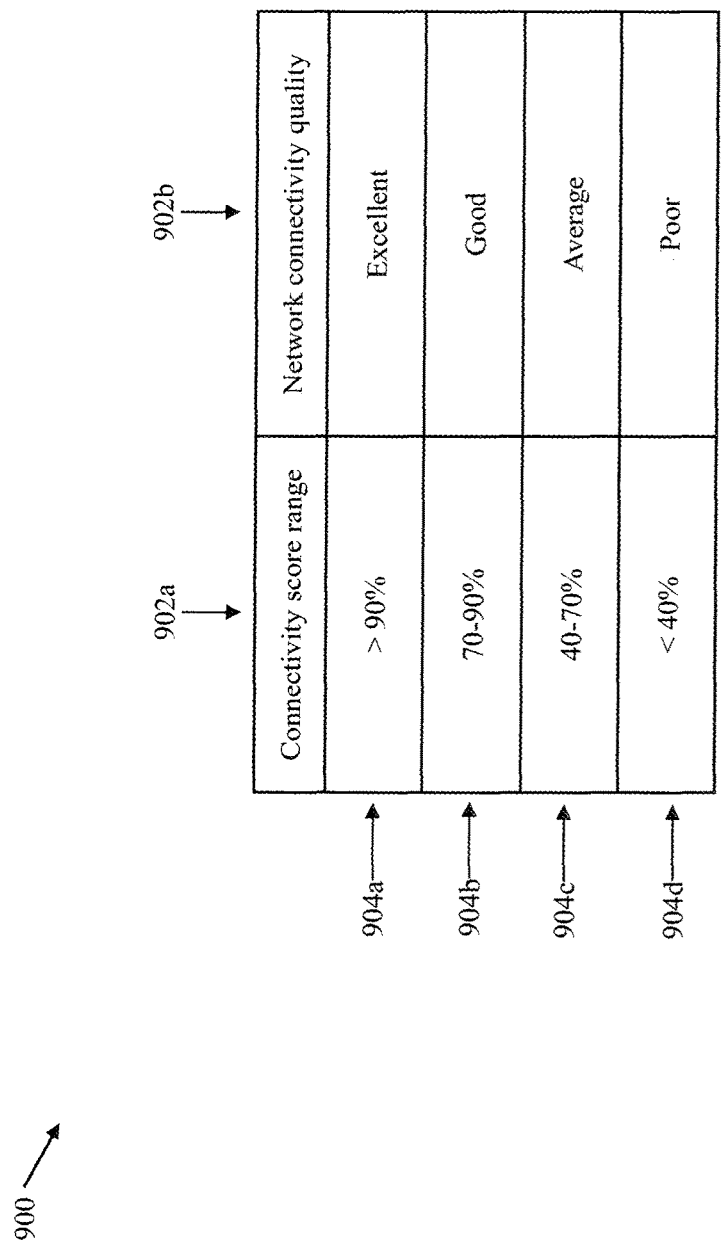
FIG. 9 is a Table that illustrates exemplary connectivity score ranges defined by the payment network server of FIG. 1, in accordance with an embodiment of the present invention.

In an exemplary scenario, when the first time period is one day, the ideal online time duration for the first terminal device 106a is '24 hours'. Thus, when the first total offline time duration is '2 hours' and the total outage time is '0.5 hours' for the first terminal device 106a, the first connectivity score of the first terminal device 106a is '88.125%' (i.e., 88.125=(24−2−0.5)*100/24). The first connectivity score of the first terminal device 106a is a qualitative measure of seamlessness of network connectivity between the first terminal device 106a and the payment network server 110. A high connectivity score is indicative of a high quality of network connectivity between the first terminal device 106a and the payment network server 110. The first connectivity score may indicate a probability of a successful completion of a transaction performed at the first terminal device 106a. It will be apparent to those of skill in the art that the first connectivity score may be expressed in other formats (such as an absolute number format) without deviating from the scope of the invention. In one embodiment, the payment network server 110 may further define various connectivity score ranges and a quality of network connectivity associated with each connectivity score range (as shown in FIG. 9) between the first terminal device 106a and the payment network server 110 based on the first connectivity score. An exemplary Table 900 is shown in FIG. 9 to illustrate the connectivity score ranges defined by the payment network server 110.

With reference to FIG. 9, Table 900 illustrates the connectivity score ranges defined by the payment network server 110. Table 900 is shown to include twenty fourth and twenty fifth columns 902a and 902b and twenty third to twenty sixth rows 904a-904d. The twenty fourth column 902a indicates the connectivity score ranges defined by the payment network server 110 and the twenty fifth column 902b indicates the qualities of network connectivity corresponding to the connectivity score ranges of the twenty fourth column 902a. Table 900 may be stored in the memory of the payment network server 110. The twenty third row 904a indicates that a quality of network connectivity between a terminal device and the payment network server 110 is excellent when the connectivity score is greater than '90%'. The twenty fourth row 904b indicates that a quality of network connectivity between a terminal device and the payment network server 110 is good when the connectivity score is '70-90%'. The twenty fifth row 904c indicates that a quality of network connectivity between a terminal device and the payment network server 110 is average when the connectivity score is '40-70%'. The twenty sixth row 904d indicates that a quality of network connectivity between a terminal device and the payment network server 110 is poor when the connectivity score is lower than '40%'. It will be apparent to those of skill in the art that the connectivity score ranges shown in Table 900 are mere examples and that the connectivity score ranges may be changed and/or updated by the payment network server 110 dynamically.

Referring now to FIG. 8, the payment network server 110 determines, based on Table 900 and the first connectivity score, that the quality of network connectivity between the first terminal device 106a and the payment network server 110 is good. The payment network server 110 transmits the third response to the user device 104. The third response is indicative of the first connectivity score (as shown by arrow 810). The third response may further indicate the quality of network connectivity between the first terminal device 106a and the payment network server 110. The service application 116 may present the first connectivity score on the UI rendered on the display of the user device 104 (as shown by arrow 812). The service application 116 may display a message to indicate the quality of network connectivity between the first terminal device 106a and the payment network server 110.

In another embodiment, the user 102 may initiate another request for obtaining connectivity scores of multiple terminal devices by providing terminal identifiers of the terminal devices. In such a scenario, the payment network server 110 may determine the connectivity scores of the terminal devices, based on the request.

It will be apparent to those of skill in the art that second through fourth connectivity scores of the second through fourth terminal devices 106b-106d may be determined in a similar manner as determined for the first terminal device 106a.

Figure 10:
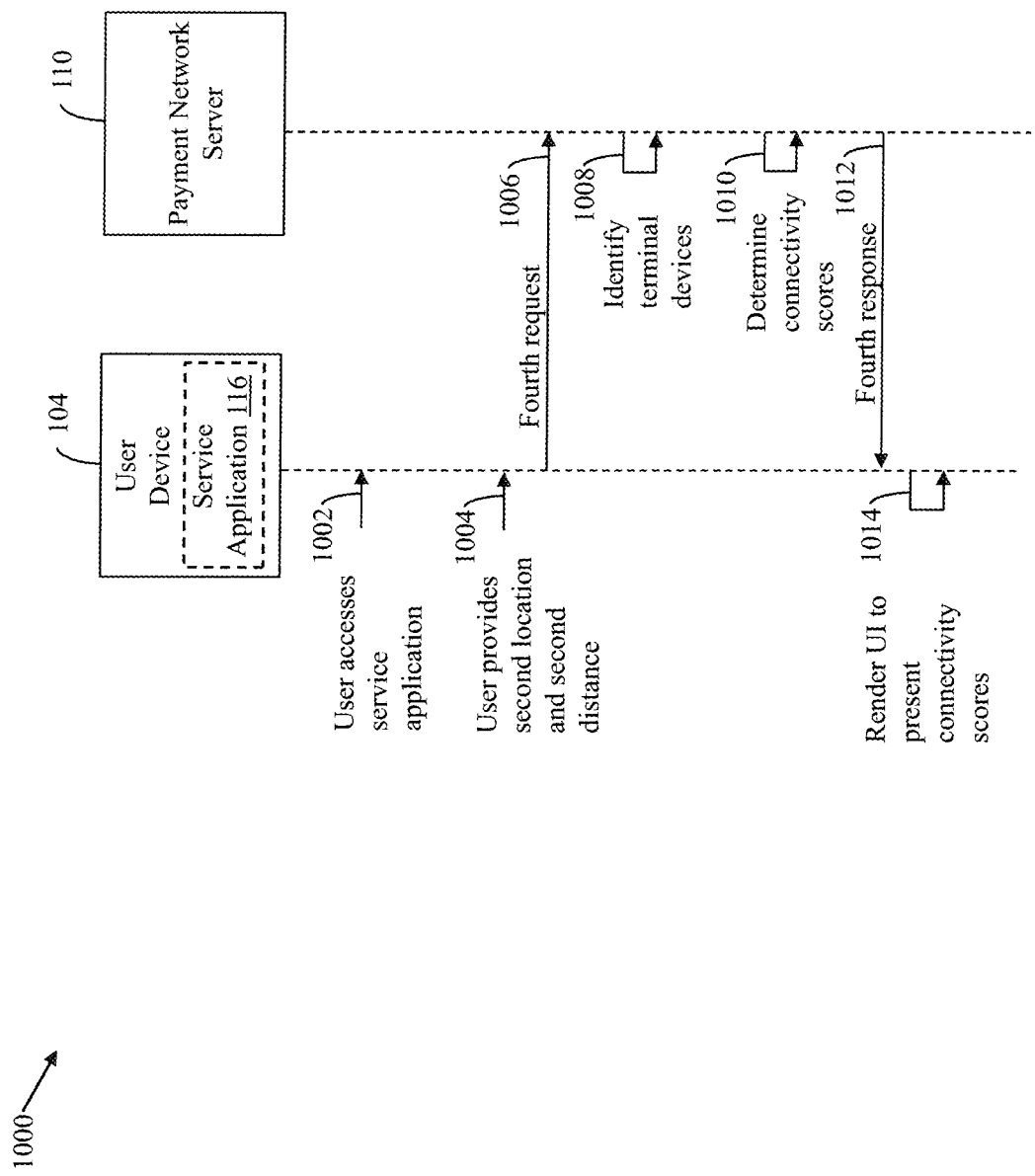
FIG. 10 represents a process flow diagram that illustrates an exemplary scenario for obtaining connectivity scores of terminal devices that are located within a specific geographical area, in accordance with an embodiment of the present invention.

FIG. 10 represents a process flow diagram 1000 that illustrates an exemplary scenario for obtaining connectivity scores of terminal devices that are located within a specific geographical area, in accordance with an embodiment of the present invention. The process flow diagram 1000 involves the user device 104 and the payment network server 110.

When the user 102 wants to obtain the connectivity scores of terminal devices that are located within the specific geographical area (e.g., within a second distance of a second location), the user 102 accesses the service application 116 that runs on the user device 104 (as shown by arrow 1002). The service application 116 renders the UI on the user device 104. The user 102 provides information pertaining to the second distance and the second location in the UI and initiates the fourth request to obtain the connectivity scores of the terminal devices that are located within the second distance of the second location (as shown by arrow 1004). In one exemplary scenario, the user 102 may want to obtain the connectivity scores of terminal devices at pharmaceutical stores located within the second distance of the second location. In such a scenario, the user 102 may further specify a merchant category or an MCC of the pharmaceutical stores along with the second distance and the second location. The user device 104 generates and communicates the fourth request to the payment network server 110 by way of the service application 116 (as shown by arrow 1006). The fourth request is indicative of the second distance and the second location. In one embodiment, the fourth request may further indicate the first merchant category specified by the user 102. Based on the fourth request, the payment network server 110 identifies terminal devices (for example, the first through third terminal devices 106a-106c) that correspond to the first merchant category and are located within the second distance of the second location (as shown by arrow 1008).

After the identification of the first through third terminal devices 106a-106c, the payment network server 110 determines the first connectivity score, a second connectivity score, and a third connectivity score of the first through third terminal devices 106a-106c, respectively (as shown by arrow 1010). The determination of the first connectivity score is explained in the foregoing description of FIG. 8. The payment network server 110 may determine the second and third connectivity scores in a manner similar to the determination of the first connectivity score, based on second and third network connectivity histories of the second and third terminal devices 106b and 106c, respectively. The payment network server 110 generates and transmits the fourth response to the user device 104 (as shown by arrow 1012). The fourth response is indicative of the first, second, and third connectivity scores and qualities of network connectivity between the first through third terminal devices 106a-106c, respectively, and the payment network server 110. The service application 116 displays the first, second, and third connectivity scores on the UI (as shown by arrow 1014). Further, the service application 116 may display a message indicating the qualities of network connectivity between the first through third terminal devices 106a-106c and the payment network server 110. In another embodiment, the fourth response may also include information regarding payment networks supported by the first through third terminal devices 106a-106c and/or acquirers (e.g., the first acquirer or the second acquirer) associated with the first through third terminal devices 106a-106c.

Figure 11A:
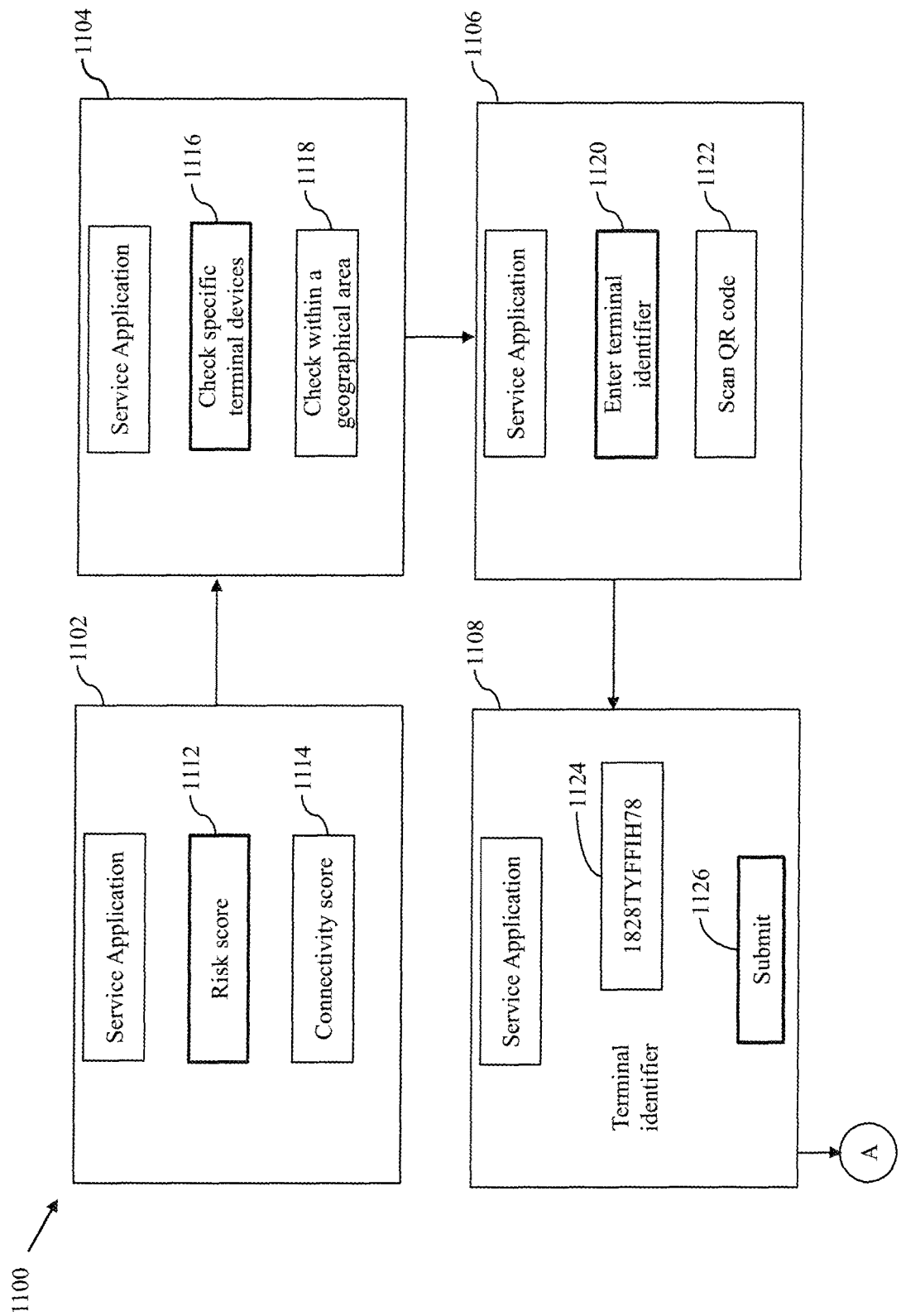
FIGS. 11A and 11B, collectively represent an exemplary scenario that illustrates user interface (UI) screens that are rendered on a display of a user device of FIG. 1, in accordance with an embodiment of the present invention.
Figure 11B:
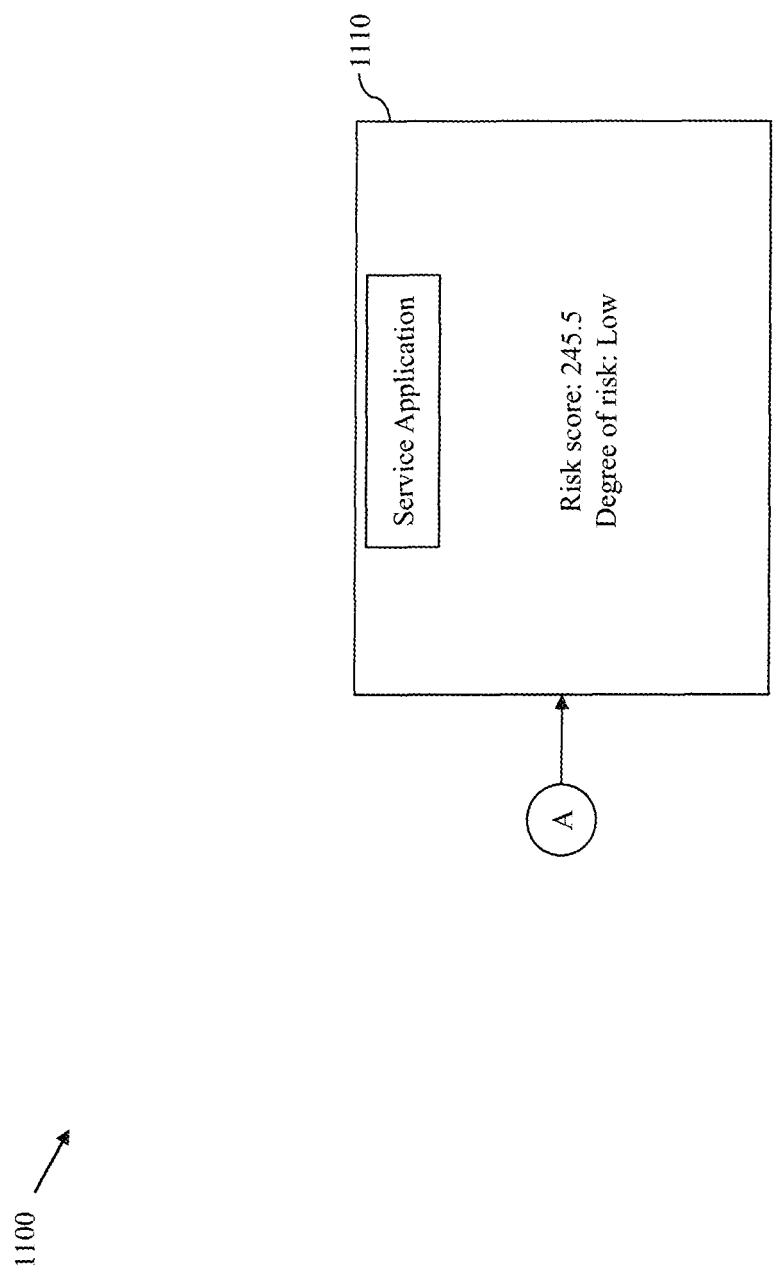

FIGS. 11A and 11B, collectively represent an exemplary scenario 1100 that illustrates first through fifth exemplary UI screens 1102, 1104, 1106, 1108, and 1110, respectively, that are rendered on the display of the user device 104, in accordance with an embodiment of the present invention. The UI screens 1102-1110 represent an interactive interface of the service application 116.

When the user 102 accesses the service application 116, the UI screen 1102 is rendered on the display of the user device 104. The UI screen 1102 includes first and second user-selectable options 1112 and 1114. The first user-selectable option 1112 allows the user 102 to initiate requests for obtaining the risk scores of the terminal devices 106. The second user-selectable option 1114 allows the user 102 to initiate requests for obtaining the connectivity scores of the terminal devices 106. When the user 102 selects the first or second user-selectable option 1112 or 1114, the service application 116 renders the UI screen 1104. In a non-limiting example, it is assumed that the user 102 selects the first user-selectable option 1112.

The UI screen 1104 includes third and fourth user-selectable options 1116 and 1118. The third user-selectable option 1116 allows the user 102 to initiate a request for obtaining the risk scores of one or more specific terminal devices (e.g., the first terminal device 106a). The fourth user-selectable option 1118 allows the user 102 to initiate a request for obtaining the risk scores of those terminal devices 106 that are located within a specific geographical area specified by the user 102. When the user 102 selects the third user-selectable option 1116, the service application 116 renders the UI screen 1106.

The UI screen 1106 includes fifth and sixth user-selectable options 1120 and 1122. The fifth user-selectable option 1120 allows the user 102 to manually enter a terminal identifier of a terminal device. The sixth user-selectable option 1122 allows the user 102 to scan a terminal identifier (for example, a quick response code, QR code) of the terminal device by way of the user device 104. When the user 102 selects the fifth user-selectable option 1120, the service application 116 renders the UI screen 1108.

The UI screen 1108 includes a first text box 1124 that allows the user 102 to enter the terminal identifier of the terminal device for which the user 102 wants to obtain the risk score. The UI screen 1108 further includes a first submit button 1126. For example, the user 102 may enter the first terminal identifier (here, '1828TYFFIH78') of the first terminal device 106a in the first text box 1124 for obtaining the risk score of the first terminal device 106a. When the user 102 selects the first submit button 1124 after entering the first terminal identifier, the service application 116 generates the first request. The user device 104 communicates the first request to the payment network server 110. The payment network server 110 determines the first risk score and communicates the first response to the user device 104.

When the user device 104 receives the first response, the service application 116 renders the UI screen 1110 (as shown in FIG. 11B). The UI screen 1110 presents the first risk score (i.e., '245.5') and a message indicating the level of risk (i.e., 'low') associated with performing a transaction at the first terminal device 106a.

In another exemplary scenario, if the user 102 had selected the second user-selectable option 1114 on the UI screen 1102, the UI screen 1110 may present the first connectivity score (i.e., '90%') and a message indicating that there is a low level of risk associated with performing a transaction at the first terminal device 106a.

Figure 12:
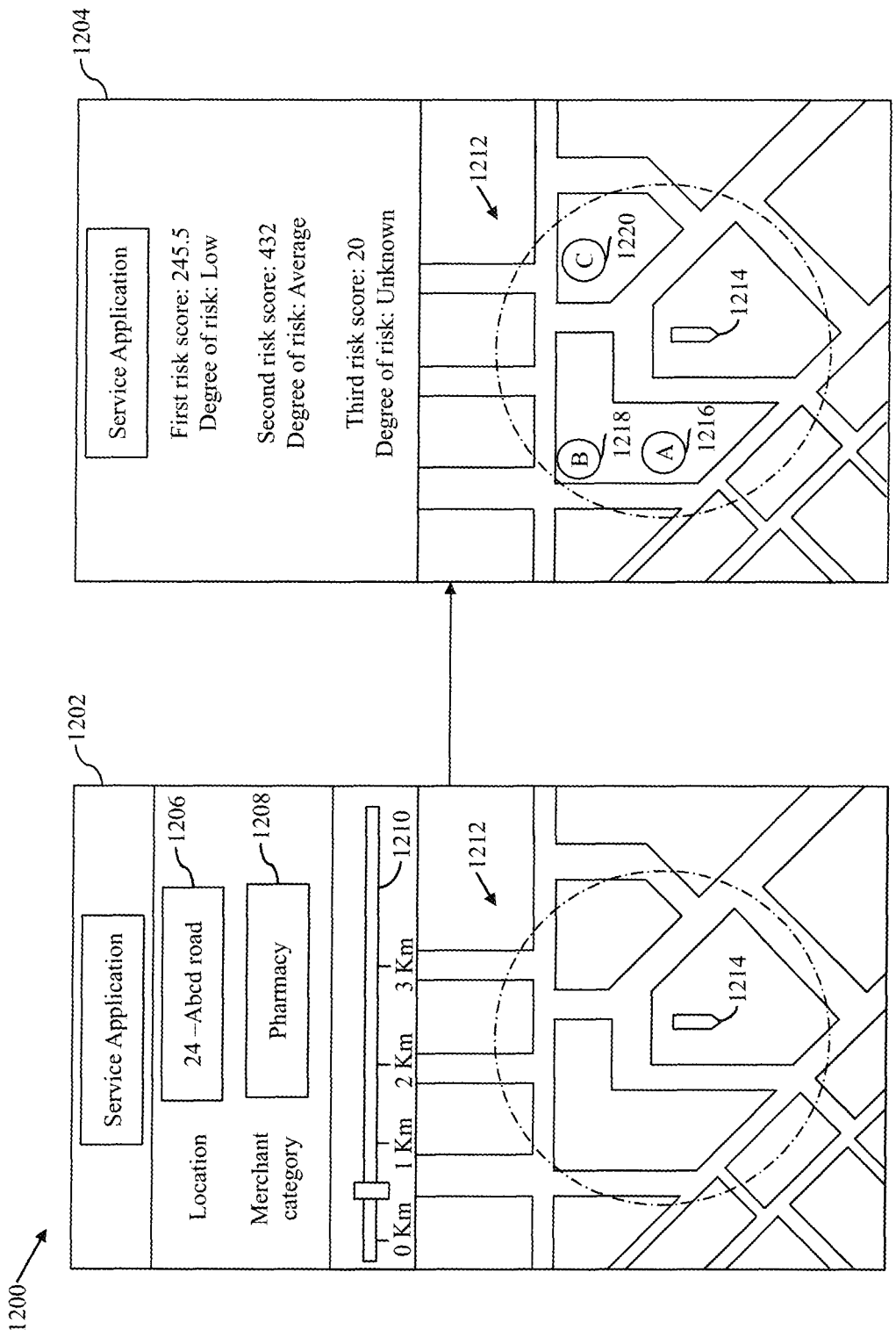
FIG. 12 represents an exemplary scenario that illustrates UI screens that are rendered on the display of the user device of FIG. 1, in accordance with another embodiment of the present invention.

FIG. 12 represents an exemplary scenario 1200 that illustrates sixth through seventh UI screens 1202 and 1204, respectively, that are rendered on the display of the user device 104, in accordance with another embodiment of the present invention. The UI screens 1202 and 1204 represent an interactive interface of the service application 116. FIG. 12 has been explained in conjunction with FIGS. 11A and 11B.

When the user 102 selects the fourth user-selectable option 1118, the service application 116 renders the UI screen 1202. The UI screen 1202 includes second and third text boxes 1206 and 1208, respectively, a virtual slider 1210, a virtual map 1212, and a first virtual marker 1214. The second text box 1206 allows the user 102 to provide the first location to the service application 116. In a non-limiting example, it is assumed that the user 102 manually enters the first location (here, '24-abcd road') in the second text box 1206. In another embodiment, the service application 116 may automatically detect a current location of the user 102 by way a global positioning system program (not shown) that runs on the user device 104. The third text box 1208 allows the user 102 to provide the first merchant category or a first MCC. The virtual slider 1210 allows the user 102 to specify the first distance. The user 102 may adjust the virtual slider 1210 to specify the first distance. The virtual slider 1210 may include gradations (e.g., '1 kilometer (km)', '2 kms', and '3 kms') to enhance an ease of use of the virtual slider 1210. In a non-limiting example, the first distance is equal to '0.5 Km'. The virtual map 1212 may include the first virtual marker 1214 that is indicative of the first location specified by the user 102. The UI screen 1202 may further include a second submit button (not shown).

The user 102 may select the second submit button after specifying the first location, the first merchant category (e.g., 'pharmacy'), and the first distance. When the user 102 selects the second submit button, the service application 116 may generate the second request for obtaining the risk scores of the terminal devices that are located within the first distance of the first location. The user device 104 communicates the second request to the payment network server 110. The payment network server 110 determines the first, second, and third risk scores (as described in the foregoing description of FIG. 7) and transmits the second response to the user device 104. Based on the second response, the service application 116 renders the UI screen 1204. The UI screen 1204 indicating the first, second, and third risk scores (for example, 245.5, 432, and 20) of the first through third terminal devices 106a-106c, respectively. The UI screen 1204 further indicates levels of risk (for example, 'Low', 'Average', and 'Unknown') associated with performing transactions at the first, second, and third terminal devices 106a-106c, respectively. The UI screen 1204 may further indicate second through fourth virtual markers 1216-1220 that indicate second through fourth locations of the first through third terminal devices 106a-106c, respectively.

In another embodiment, the service application 116 may further present the UI screens 1202 and 1204 to present the connectivity scores of the terminal devices that are located within the geographical area specified by the user 102.

FIG. 13 is a block diagram that illustrates the payment network server 110, in accordance with an embodiment of the present invention. The payment network server 110 includes a processor 1302, a memory 1304, and a transceiver 1306. The processor 1302, the memory 1304, and the transceiver 1306 communicate with each other by way of a communication bus 1308. The processor 1302 includes an application host 1310 and a score determination engine 1312.

The processor 1302 includes suitable logic, circuitry, interfaces, and/or code, executed by the circuitry, for determining the connectivity and risk scores of the terminal devices 106 based on requests received from the user device 104. The processor 1302 stores, in the memory 1304, account profiles of users (e.g., the user 102) in possession of transaction cards associated with the payment network. For example, an account profile of the user 102 may include transaction card details of the first transaction card. The processor 1302 further hosts the service application 116 that is executable on the user device 104. Examples of the processor 1302 may include, but are not limited to, an application-specific integrated circuit (ASIC) processor, a reduced instruction set computer (RISC) processor, a complex instruction set computer (CISC) processor, a field programmable gate array (FPGA), and the like. The processor 1302 executes operations for determining the risk scores and the connectivity scores by way of the application host 1310 and the score determination engine 1312.

The application host 1310 executes operations for hosting the service application 116 that is executable on various user devices, such as the user device 104. The application host 1310 may control the service application 116 and cause it to perform various operations (such as the rendering of the UI screens 1102-1110 and 1202-1204) as described in FIGS. 11A, 11B, and 12. By way of the UI screens 1102-1110 and 1202-1204, the application host 1310 allows the users (e.g., the user 102) to initiate requests (e.g., the first, second, third, and fourth requests) for obtaining the risk scores or the connectivity scores of terminal devices (e.g., the terminal devices 106), as described in the foregoing descriptions of FIGS. 5, 7, 8, and 10.

The score determination engine 1312 determines the risk scores (e.g., the first and second risk scores) and the connectivity scores (e.g., the first and second connectivity scores) based on the requests received by way of the service application 116. The score determination engine 1312 determines the risk scores and the connectivity scores of the terminal devices 106 based on transaction histories 1314 and network connectivity histories 1316 of the terminal devices 106, as described in the foregoing. For determining the risk scores, the score determination engine 1312 may assign the weights to the authorization response codes, the advice reason codes, the processing stages, or the like (as described in FIGS. 2,3, and 4). The score determination engine 1312 may further define the risk score and connectivity score ranges (as described in foregoing description of FIGS. 6 and 9). The score determination engine 1312 may further communicate responses (e.g., the first, second, and third responses) to the user device 104 based on the determination of the risk scores and/or the connectivity scores.

The memory 1304 includes suitable logic, circuitry, interfaces, and/or code, executable by the circuitry, to store the account profiles of the users (such as the user 102). The memory 1304 further stores the transaction histories 1314 (e.g., the first transaction history) and the network connectivity histories 1316 (e.g., the first network connectivity history) of the terminal devices 106. The memory 1304 may further store the data pertaining to Tables 200, 300, 400, 600, and 900. Examples of the memory 1304 may include a random-access memory (RAM), a read-only memory (ROM), a removable storage drive, a hard disk drive (HDD), a flash memory, a solid-state memory, and the like. It will be apparent to a person skilled in the art that the scope of the invention is not limited to realizing the memory 1304 in the payment network server 110, as described herein. In another embodiment, the memory 1304 may be realized in form of a database server or a cloud storage working in conjunction with the payment network server 110, without departing of the scope of the invention.

The transceiver 1306 includes suitable logic, circuitry, interfaces, and/or code, executable by the circuitry, to transmit and receive data over the communication network 114 using one or more communication network protocols. The transceiver 1306 transmits various requests and messages to the user device 104, the acquirer servers 108, and the issuer server 112. The transceiver 1306 further receives various requests and messages from the user device 104, the acquirer servers 108, and the issuer server 112. Examples of the transceiver 1306 may include, but are not limited to, an antenna, a radio frequency transceiver, a wireless transceiver, a Bluetooth transceiver, an ethernet port, a universal serial bus (USB) port, or any other device configured to transmit and receive data.

Figure 14A:
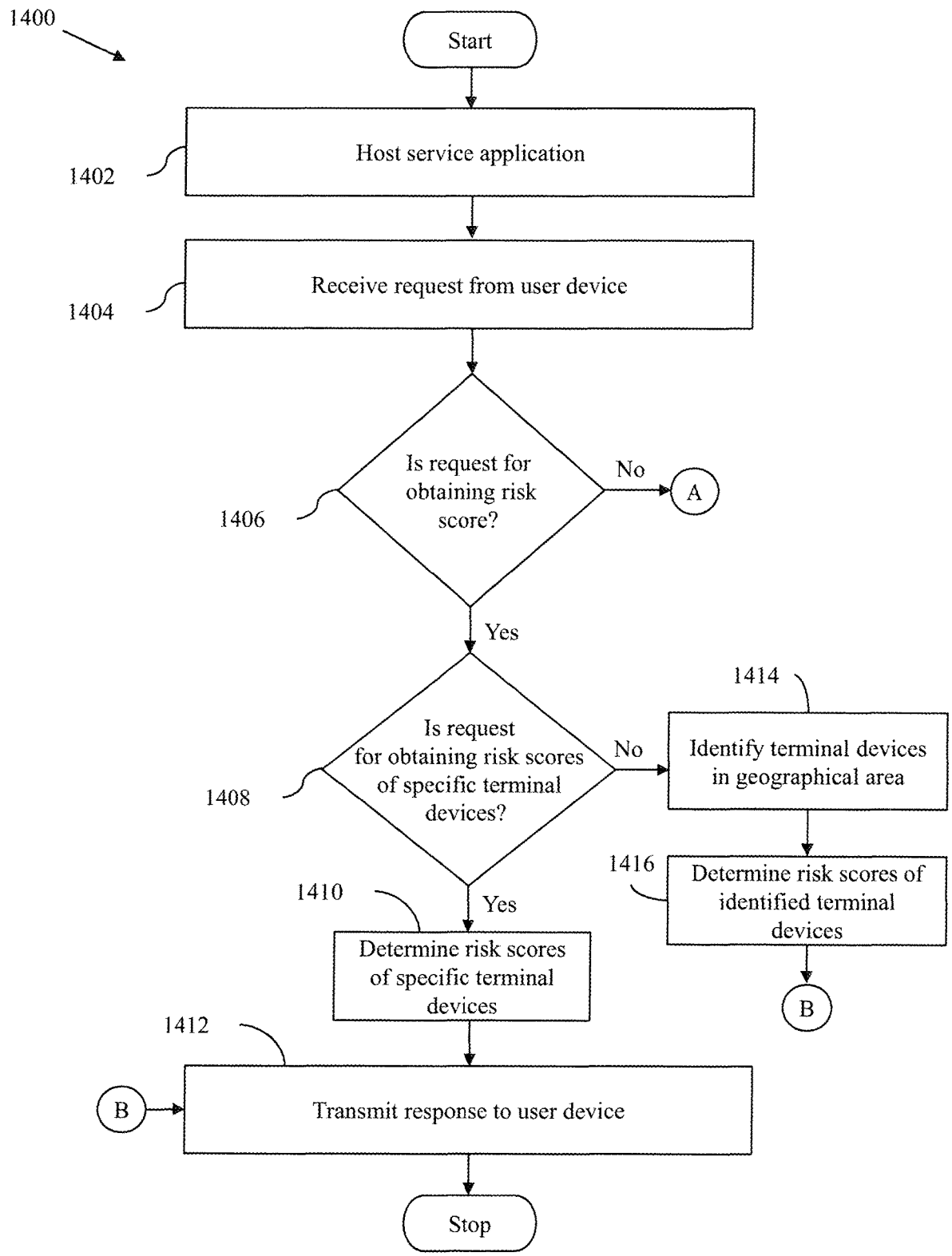
FIGS. 14A and 14B, collectively represent a flow chart that illustrates a method for providing performance assessment of the terminal devices of FIG. 1, in accordance with an embodiment of the present invention.
Figure 14B:
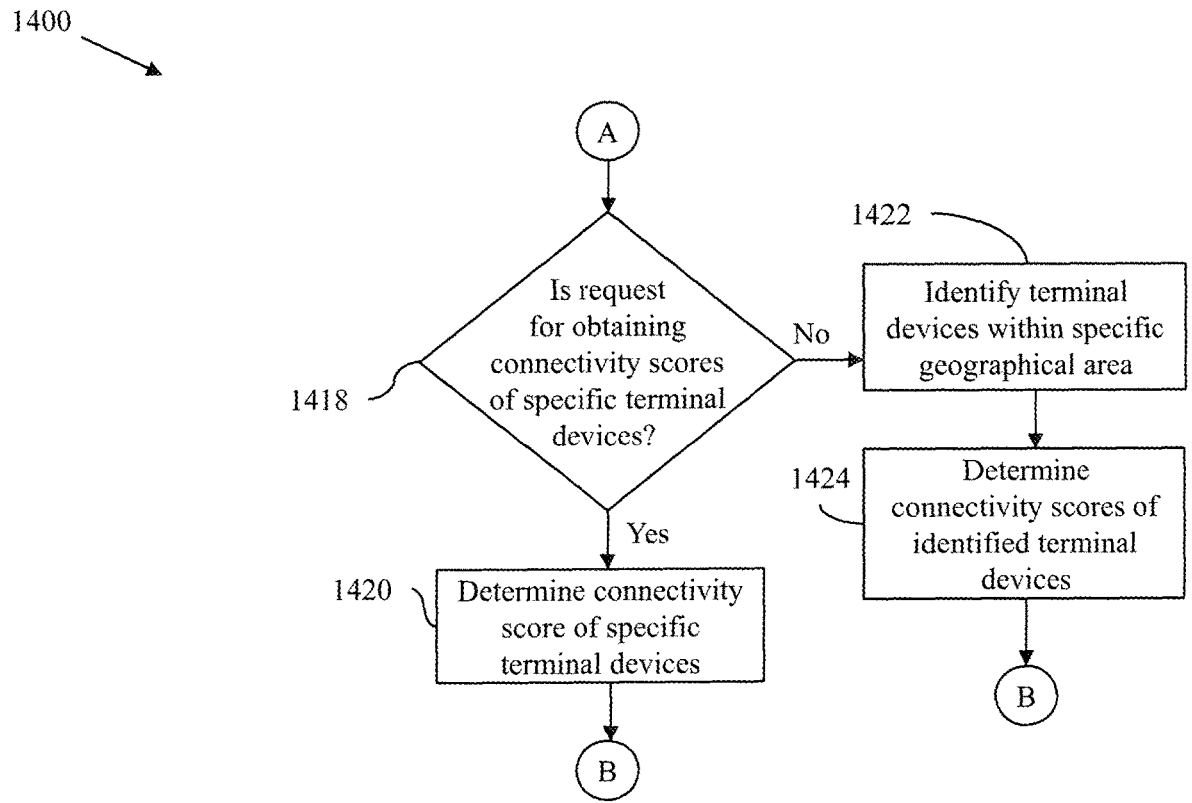

FIGS. 14A and 14B, collectively represent a flow chart 1400 that illustrates a method for providing performance assessment of the terminal devices 106, in accordance with an embodiment of the present invention.

At step 1402, the payment network server 110 hosts the service application 116. The user 102 may initiate a request for obtaining the risk scores or the connectivity scores of the terminal devices 106. The user device 104 generates and communicates the request to the payment network server 110. At step 1404, the payment network server 110 receives the request from the user device 104. At step 1406, the payment network server 110 determines that whether the request is for obtaining the risk scores. If at step 1406, it is determined that the request is for obtaining the risk scores, step 1408 is performed. At step 1408, the payment network server 110 determines whether the request is for obtaining the risk scores of one or more specific terminal devices. If at step 1408, it is determined that the request is for obtaining the risk scores of one or more specific terminal devices, step 1410 is performed. At step 1410, the payment network server 110 determines the risk scores of the specific terminal devices. The payment network server 110 determines the risk scores of the specific terminal devices based on the corresponding transaction histories 1314. The payment network server 110 generates a response to communicate the determined risk scores of the specific terminal devices to the user 102. At step 1412, the payment network server 110 transmits the generated response to the user device 104.

If at step 1408, it is determined that the request is not for obtaining the risk scores of one or more specific terminal devices (i.e., the request is for obtaining the risk scores of terminal devices within a specific geographical area), step 1414 is performed. At step 1414, the payment network server 110 identifies the terminal devices within the specific geographical area. At step 1416, the payment network server 110 determines the risk scores of the identified terminal devices within the geographical area. The payment network server 110 determines the risk scores of the identified terminal devices based on the corresponding transaction histories 1314. The payment network server 110 generates a response to communicate the determined risk scores of the identified terminal devices to the user 102 and executes step 1412.

If at step 1406, the payment network server 110 determines that the request is not for obtaining the risk scores (i.e., the request is for obtaining the connectivity scores of the terminal devices 106), step 1418 is performed. At step 1418, the payment network server 110 determines whether the request is for obtaining the connectivity score of one or more specific terminal devices. If at step 1418, it is determined that the request is for obtaining the connectivity scores of the specific terminal devices, step 1420 is performed. At step 1420, the payment network server 110 determines the connectivity scores of the specific terminal devices. The payment network server 110 determines the connectivity scores of the specific terminal devices based on the corresponding network connectivity histories 1316. The payment network server 110 generates a response to communicate the determined connectivity scores of the specific terminal devices to the user 102 and executes step 1412.

If at step 1418, it is determined that the request is not for obtaining the connectivity scores of the specific terminal devices (i.e., the request is for obtaining the connectivity scores of those terminal devices that are located within a specific geographical area), step 1422 is performed. At step 1422, the payment network server 110 identifies the terminal devices within the specific geographical area. At step 1424, the payment network server 110 determines the connectivity scores of the identified terminal devices within the geographical area. The payment network server 110 determines the connectivity scores of the terminal devices within the geographical area based on the corresponding network connectivity histories 1316. The payment network server 110 generates a response to communicate the determined connectivity scores of the identified terminal devices to the user 102 and executes step 1412.

Figure 15:
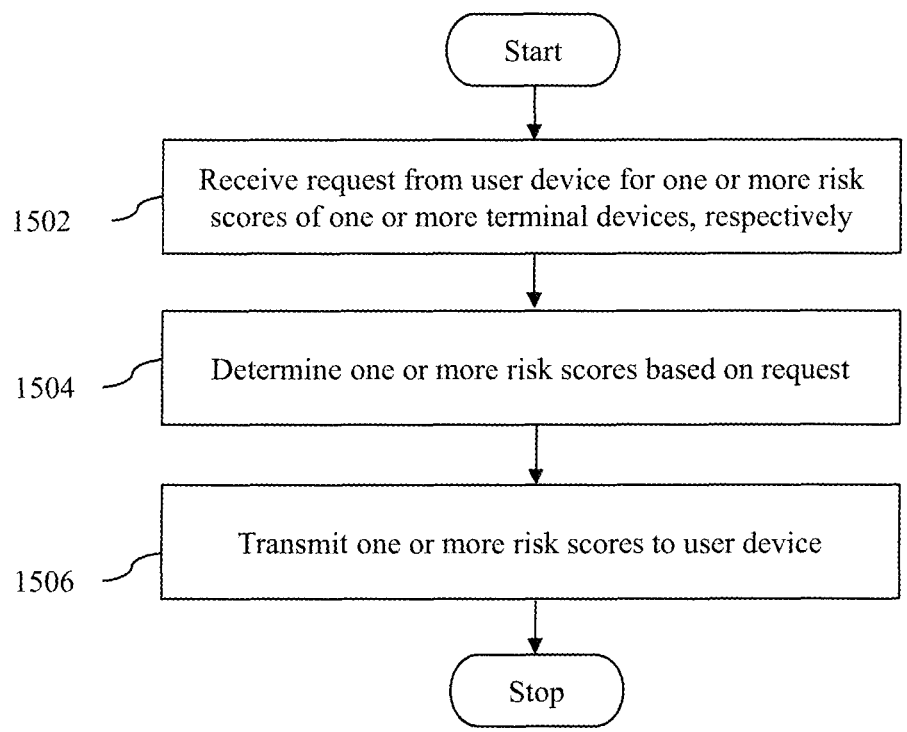
FIG. 15 represents a high-level flow chart that illustrates the method for providing performance assessment of the terminal devices, in accordance with an embodiment of the present invention.

FIG. 15 represents a high-level flow chart 1500 that illustrates the method for providing performance assessment of the terminal devices 106, in accordance with an embodiment of the present invention. At step 1502, the payment network server 110 receives, from the user device 104, a request (e.g., the first request or the second request) for one or more risk scores of one or more terminal devices (e.g., the terminal devices 106). Each risk score is a measure of risk associated with performing a transaction at a corresponding terminal device of the one or more terminal devices. At step 1504, the payment network server 110 determines the one or more risk scores based on the request. Each risk score is determined based on the transaction history (e.g., the transaction histories 1314) of the corresponding terminal device. At step 1506, the payment network server 110 transmits the one or more risk scores to the user device 104. The one or more risk scores are presented to the user 102 on the UI (e.g., the UI screens 1110 or 1204) rendered in the user device 104.

Figure 16:
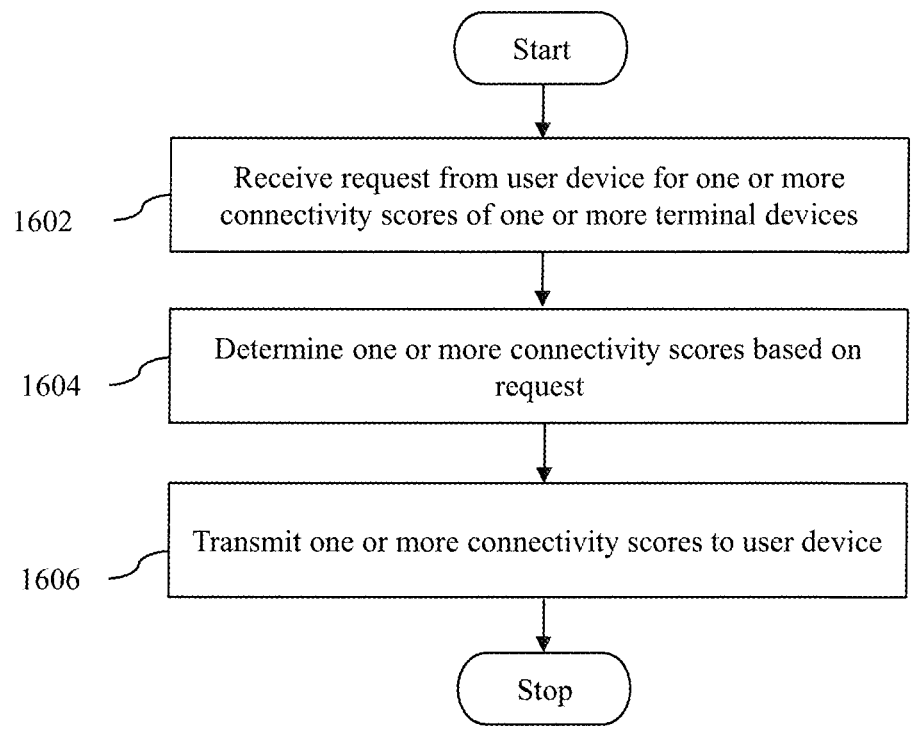
FIG. 16 represents a high-level flow chart that illustrates the method for providing performance assessment of the terminal devices, in accordance with another embodiment of the present invention.

FIG. 16 represents a high-level flow chart 1600 that illustrates the method for providing performance assessment of the terminal devices 106, in accordance with another embodiment of the present invention. At step 1602, the payment network server 110 receives, from the user device 104, a request (e.g., the third request) for one or more connectivity scores of one or more terminal devices (e.g., the terminal devices 106). Each connectivity score is a qualitative measure of seamlessness of network connectivity between a corresponding terminal device of the one or more terminal devices and the payment network server 110. At step 1604, the payment network server 110 determines the one or more connectivity scores based on the request. Each connectivity score is determined based on a network connectivity history (e.g., the network connectivity histories 1316) of the corresponding terminal device. At step 1606, the payment network server 110 transmits the one or more connectivity scores to the user device 104. The one or more connectivity scores are presented to the user 102 on the UI (e.g., the UI screens 1110 or 1204) rendered in the user device 104.

Figure 17:
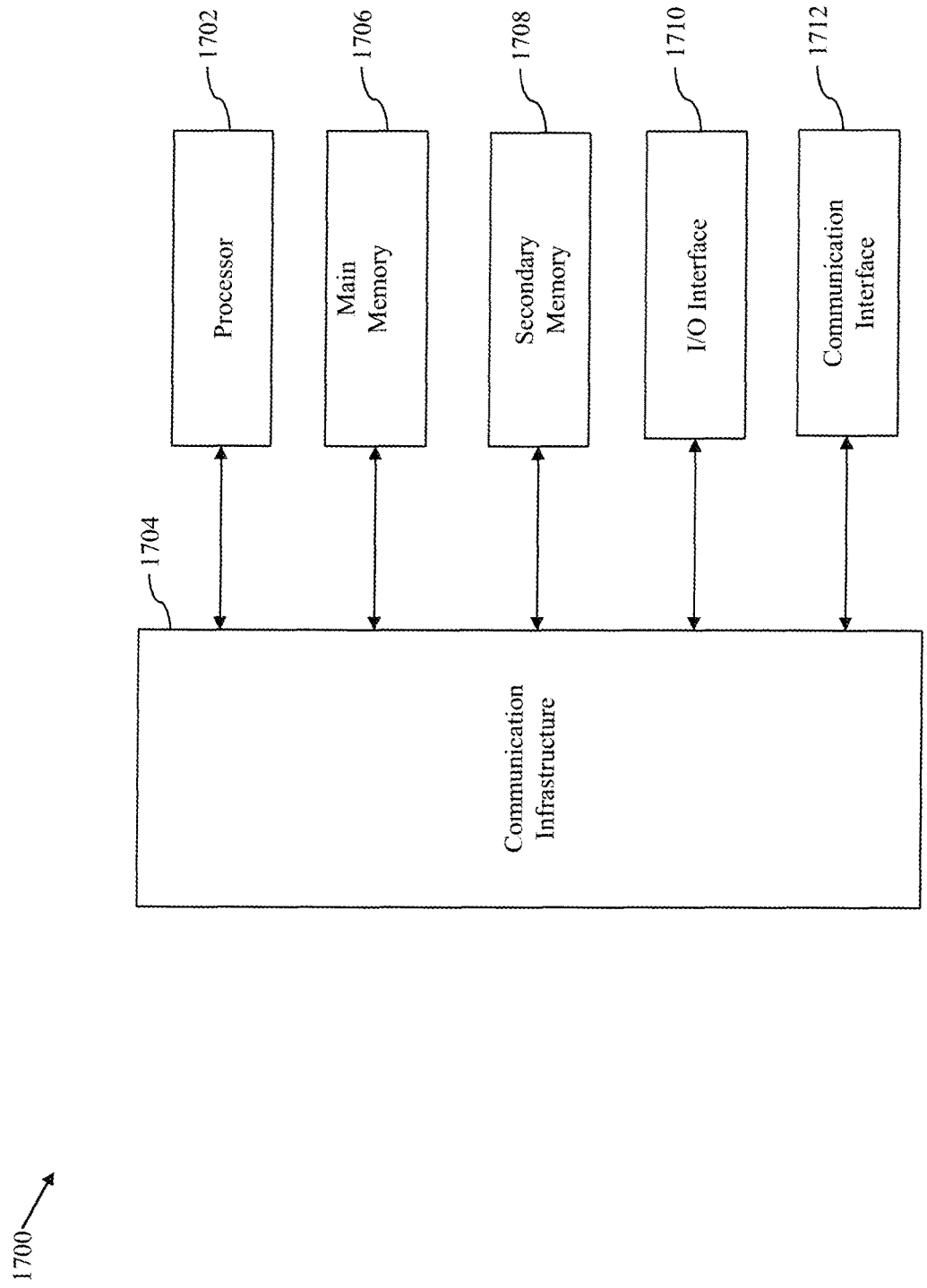
FIG. 17 is a block diagram that illustrates system architecture of a computer system, in accordance with an embodiment of the present invention.

FIG. 17 is a block diagram 1700 that illustrates system architecture of a computer system, in accordance with an embodiment of the present invention. An embodiment of present invention, or portions thereof, may be implemented as computer readable code on the computer system 1700. In one example, the acquirer servers 108, the payment network server 110, and the issuer server 112 may be implemented in the computer system 1700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 14A, 14B, 15, and 16.

The computer system 1700 includes a processor 1702 that may be a special-purpose or a general-purpose processing device. The processor 1702 may be a single processor, multiple processors, or combinations thereof. The processor 1702 may have one or more processor cores. In one example, the processor 1702 is an octa-core processor. The processor 1702 may be connected to a communication infrastructure 1704, such as a bus, message queue, multi-core message-passing scheme, and the like. The computer system 1700 may further include a main memory 1706 and a secondary memory 1708. Examples of the main memory 1706 may include RAM, ROM, and the like. The secondary memory 1708 may include a hard disk drive or a removable storage drive, such as a floppy disk drive, a magnetic tape drive, a compact disc, an optical disk drive, a flash memory, and the like. The removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1700 further includes an input/output (I/O) interface 1710 and a communication interface 1712. The I/O interface 1710 includes various input and output devices that are configured to communicate with the processor 1702. Examples of the input devices may include a keyboard, a mouse, a joystick, a touchscreen, a microphone, and the like. Examples of the output devices may include a display screen, a speaker, headphones, and the like. The communication interface 1712 may be configured to allow data to be transferred between the computer system 1700 and various devices that are communicatively coupled to the computer system 1700. Examples of the communication interface 1712 may include a modem, a network interface, i.e., an Ethernet card, a communication port, and the like. Data transferred via the communication interface 1712 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 1700. Examples of the communication channel may include, but are not limited to, cable, fiber optics, a phone line, a cellular phone link, a radio frequency link, and the like.

The main memory 1706 and the secondary memory 1708 are non-transitory computer readable mediums which may provide data that enables the computer system 1700 to implement the methods illustrated in FIGS. 14A, 14B, 15, and 16. In an embodiment, the present invention may be implemented using a computer implemented application (for example, the service application 116) hosted by the computer system 1700. In such a scenario, the main memory 1706 and the secondary memory 1708 may include computer executable instructions, which when executed by the computer system 1700 cause the computer system 1700 to execute operations illustrated in FIGS. 14A, 14B, 15, and 16.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. For instance, at least one processor such as the processor 1702 and a memory such as the main memory 1706 and the secondary memory 1708 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Thus, the environment 100 enables the user 102 to preemptively identify terminal devices that are risky or those that offer seamless network connectivity. The user 102 may view the risk scores of the terminal devices 106 prior to performing a transaction. Consequently, the user 102 may choose to perform the transaction at a terminal device that is deemed safe by the payment network server 110, thereby preventing the user 102 from falling prey to frauds and scams that may be perpetuated by some merchants. The invention further incentivizes due diligence by merchants associated with the terminal devices 106. Merchants associated with those terminal devices that are deemed safe are likely to see increased business due to an increase in a count of users who may choose to perform transactions at those terminal devices. Merchants associated with those terminal devices that are deemed risky are indirectly penalized, since the users may not perform transactions at those terminal devices that are deemed risky. Consequently, the invention may engender a decrease in a count of fraudulent transactions taking place at the terminal devices 106, leading to a corresponding decrease in a count of chargebacks, arbitrations, or the like. Thus, financial institutions (such as acquirers, payment networks, and issuers) may witness reduced wastage of time and/or resources. The decrease in the count of fraudulent transactions may also cause users to perform transactions more often at the terminal devices 106, leading to increased business for acquirers, issuers, and payment networks. Furthermore, the user 102 may view connectivity scores (e.g., the first connectivity score) of the terminal devices 106 prior to performing a transaction. Consequently, the user 102 may choose to perform the transaction at that terminal device which offer seamless network connectivity. Thus, a count of transactions that fail due to network or connection failures is reduced. As a result, a user experience of performing transactions at the terminal devices 106 is enhanced.

Techniques consistent with the present invention provide, among other features, systems and methods for providing performance assessment of terminal devices. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for providing performance assessment of one or more terminal devices, the method comprising:
providing an interactive user interface to be rendered on a user device to a user;
receiving, by a server from the user device, a first request for one or more connectivity scores of the one or more terminal devices, respectively, wherein each connectivity score is a qualitative measure of seamlessness of network connectivity between a corresponding terminal device of the one or more terminal devices and the server, wherein the request is initiated by the user via the interactive user interface, and wherein the request includes information pertaining to a location and a distance;
identifying, by the server, the one or more terminal devices from a plurality of terminal devices, wherein the one or more terminal devices are located within the distance of the location;
determining, by the server based on the first request, the one or more connectivity scores, wherein each connectivity score is determined based on a network connectivity history of the corresponding terminal device;
retrieving a transaction history for each of the one or more terminal devices; and
transmitting, by the server to the user device, the one or more connectivity scores, wherein the one or more connectivity scores are presented to the user via the user interface rendered on the user device;
wherein the transaction history of each terminal device includes a count of transactions declined at the terminal device due to at least one of a security violation, an invalid merchant identifier, or a cryptographic error.

2. The method of claim 1, further comprising hosting, by the server, a service application executable on the user device, wherein the request is received by the server by way of the service application, and wherein the user interface is rendered by the service application.

3. The method of claim 1, wherein the network connectivity history of each terminal device includes an offline time duration of an acquirer associated with the corresponding terminal device and a count of transactions declined by the acquirer when the acquirer is online.

4. The method of claim 1, wherein the request includes one or more identifiers of the one or more terminal devices, respectively.

5. The method of claim 4, further comprising identifying, by the server, the one or more terminal devices based on the one or more identifiers.

6. The method of claim 1, further comprising:
receiving, by the server from the user device, a second request for one or more risk scores of the one or more terminal devices, respectively, wherein each risk score indicates a measure of risk associated with performing a transaction at a corresponding terminal device of the one or more terminal devices;
determining, by the server based on the second request, the one or more risk scores, wherein each risk score is determined based on the transaction history of the corresponding terminal device; and
transmitting, by the server to the user device, the one or more risk scores, wherein the one or more risk scores are presented to the user via the user interface rendered on the user device.

7. A system for providing performance assessment of one or more terminal devices, the system comprising:
a payment network server that is configured to perform operations comprising:
providing an interactive user interface to be rendered on a user device to a user;
receiving, from the user device, a first request for one or more connectivity scores of the one or more terminal devices, respectively, wherein each connectivity score is a qualitative measure of seamlessness of network connectivity between a corresponding terminal device of the one or more terminal devices and the server, wherein the request is initiated by the user via the interactive user interface, and wherein the request includes information pertaining to a location and a distance;
identifying the one or more terminal devices from a plurality of terminal devices, wherein the one or more terminal devices are located within the distance of the location;
determining, based on the first request, the one or more connectivity scores, wherein each connectivity score is determined based on a network connectivity history of the corresponding terminal device;
retrieving a transaction history for each of the one or more terminal devices; and
transmitting, to the user device, the one or more connectivity scores, wherein the one or more connectivity scores are presented to the user via the user interface rendered on the user device,
wherein the transaction history of each terminal device includes a count of transactions declined at the terminal device due to at least one of a security violation, an invalid merchant identifier, or a cryptographic error.

8. The system of claim 7, wherein the payment network server is configured to perform further operations comprising hosting a service application executable on the user device, wherein the request is received by way of the service application, and wherein the user interface is rendered by the service application.

9. The system of claim 7, wherein the network connectivity history of each terminal device includes an offline time duration of an acquirer associated with the corresponding terminal device and a count of transactions declined by the acquirer when the acquirer is online.

10. The system of claim 7, wherein the request includes one or more identifiers of the one or more terminal devices, respectively.

11. The system of claim 10, wherein the payment network server is configured to perform further operations comprising identifying, by the server, the one or more terminal devices based on the one or more identifiers.

12. The system of claim 7, wherein the payment network server is configured to perform further operations comprising:
receiving, by the server from the user device, a second request for one or more risk scores of the one or more terminal devices, respectively, wherein each risk score indicates a measure of risk associated with performing a transaction at a corresponding terminal device of the one or more terminal devices;
determining, by the server based on the second request, the one or more risk scores, wherein each risk score is determined based on the transaction history of the corresponding terminal device; and transmitting, by the server to the user device, the one or more risk scores, wherein the one or more risk scores are presented to the user via the user interface rendered on the user device.

13. A non-transitory computer readable medium having instructions stored thereon which, when executed by a computing device, cause the computing device to perform operations comprising:

providing an interactive user interface to be rendered on a user device to a user;

receiving, by a server from the user device, a first request for one or more connectivity scores of the one or more terminal devices, respectively, wherein each connectivity score is a qualitative measure of seamlessness of network connectivity between a corresponding terminal device of the one or more terminal devices and the server, wherein the request is initiated by the user via the interactive user interface, and wherein the request includes information pertaining to a location and a distance;

identifying, by the server, the one or more terminal devices from a plurality of terminal devices, wherein the one or more terminal devices are located within the distance of the location;

determining, by the server based on the first request, the one or more connectivity scores, wherein each connectivity score is determined based on a network connectivity history of the corresponding terminal device;

retrieving a transaction history for each of the one or more terminal devices; and transmitting, by the server to the user device, the one or more connectivity scores, wherein the one or more connectivity scores are presented to the user via the user interface rendered on the user device, wherein the transaction history of each terminal device includes a count of transactions declined at the terminal device due to at least one of a security violation, an invalid merchant identifier, or a cryptographic error.

14. The non-transitory computer readable medium of claim 13, wherein the instructions, when executed, cause the computing device to perform further operations comprising hosting, by the server, a service application executable on the user device, wherein the request is received by the server by way of the service application, and wherein the user interface is rendered by the service application.

15. The non-transitory computer readable medium of claim 13, wherein the network connectivity history of each terminal device includes an offline time duration of an acquirer associated with the corresponding terminal device and a count of transactions declined by the acquirer when the acquirer is online.

16. The non-transitory computer readable medium of claim 13, wherein the request includes one or more identifiers of the one or more terminal devices, respectively.

17. The non-transitory computer readable medium of claim 16, wherein the instructions, when executed, cause the computing device to perform further operations comprising identifying, by the server, the one or more terminal devices based on the one or more identifiers.

18. The non-transitory computer readable medium of claim 13, wherein the instructions, when executed, cause the computing device to perform further operations comprising:

receiving, by the server from the user device, a second request for one or more risk scores of the one or more terminal devices, respectively, wherein each risk score indicates a measure of risk associated with performing a transaction at a corresponding terminal device of the one or more terminal devices;

determining, by the server based on the second request, the one or more risk scores, wherein each risk score is determined based on the transaction history of the corresponding terminal device; and transmitting, by the server to the user device, the one or more risk scores, wherein the one or more risk scores are presented to the user via the user interface rendered on the user device.

* * * * *